(12) United States Patent
Green et al.

(10) Patent No.: US 8,792,041 B2
(45) Date of Patent: Jul. 29, 2014

(54) CONTROL SWITCH FOR A PORTABLE DIGITAL VIDEO CAMERA

(75) Inventors: Jason Green, Seattle, WA (US); Marc Barros, Bellevue, WA (US); David Thorpe, Portland, OR (US); Chunshik Kim, Portland, OR (US); Felix Ballerstedt, Portland, OR (US); David Randall Knaub, Portland, OR (US); Oved Valadez, Portland, OR (US); Peter Kettenring, Reinheim (DE); Margaret Novotny, Greenbrae, CA (US); Laura O'Donnell, El Segundo, CA (US); Jeff Howard, San Francisco, CA (US)

(73) Assignee: Contour, LLC, Provo, UT (US)

( * ) Notice: Subject to any disclaimer, the term of this patent is extended or adjusted under 35 U.S.C. 154(b) by 870 days.

(21) Appl. No.: 12/671,442

(22) PCT Filed: Jul. 30, 2008

(86) PCT No.: PCT/US2008/071661
§ 371 (c)(1),
(2), (4) Date: May 14, 2010

(87) PCT Pub. No.: WO2009/018391
PCT Pub. Date: Feb. 5, 2009

(65) Prior Publication Data
US 2010/0253826 A1    Oct. 7, 2010

Related U.S. Application Data

(63) Continuation-in-part of application No. 29/322,219, filed on Jul. 30, 2008, now Pat. No. Des. 616,006.

(60) Provisional application No. 60/952,810, filed on Jul. 30, 2007.

(51) Int. Cl.
*H04N 5/225*    (2006.01)

(52) U.S. Cl.
USPC ........................................................ 348/335

(58) Field of Classification Search
CPC .................................................... H04N 5/2252
USPC ........................................................ 348/335
See application file for complete search history.

(56) References Cited

U.S. PATENT DOCUMENTS

| D246,528 S | 11/1977 | Miller |
| 4,516,157 A | 5/1985 | Campbell |

(Continued)

FOREIGN PATENT DOCUMENTS

| CA | 2 463 117 A1 | 8/2004 |
| CN | 1157078 | 8/1997 |

(Continued)

OTHER PUBLICATIONS

Austrian Patent Office, Search and Opinion on Legal Validity, Aug. 3, 2010 (German language version and English translation).

(Continued)

*Primary Examiner* — Usman Khan
(74) *Attorney, Agent, or Firm* — Knobbe, Martens, Olson and Bear,LLP

(57) ABSTRACT

An integrated hands-free, point of view, action-sports, digital video camera (or camcorder) (10) includes: a rotary horizon adjustment controller (14) for adjusting the orientation of a horizontal image plane (16) recorded by an image sensor with respect to the orientation of a camera housing (22); a laser alignment system with laser sources (48) capable of projecting light to define a horizontal projection axis (52) that is coordinated with orientation of the horizontal image plane (16); a manually operable switch (80), which covers a microphone (90) whenever the switch (80) is in the OFF position, for controlling video data capture; and a "quick-release" mounting system (120) that retains a desired orientation of the camera (10).

37 Claims, 15 Drawing Sheets

(56) References Cited

U.S. PATENT DOCUMENTS

| | | | |
|---|---|---|---|
| 4,525,045 | A | 6/1985 | Fazekas |
| D292,982 | S | 12/1987 | Nakatani |
| 5,056,745 | A | 10/1991 | Gelbard |
| 5,218,439 | A | 6/1993 | Mizoguchi et al. |
| 5,557,329 | A | 9/1996 | Lim |
| 5,583,571 | A | 12/1996 | Friedland |
| D378,095 | S | 2/1997 | Hasegawa |
| D392,300 | S | 3/1998 | Chow et al. |
| 5,859,666 | A | 1/1999 | Manabe |
| 5,966,176 | A | 10/1999 | Chow et al. |
| 6,028,627 | A | 2/2000 | Helmsderfer |
| 6,091,831 | A | 7/2000 | Cho |
| D430,888 | S | 9/2000 | Adachi et al. |
| 6,142,437 | A | 11/2000 | Wilkins, Jr. |
| 6,377,302 | B1 | 4/2002 | Ozaki et al. |
| 6,421,088 | B1 | 7/2002 | Lee |
| 6,704,044 | B1 | 3/2004 | Foster et al. |
| 6,819,354 | B1 | 11/2004 | Foster et al. |
| D506,489 | S | 6/2005 | Owada |
| D510,374 | S | 10/2005 | Greenwood et al. |
| 6,955,484 | B2 | 10/2005 | Woodman |
| D547,346 | S | 7/2007 | Ollila |
| 7,273,321 | B2 | 9/2007 | Woodman |
| D558,805 | S | 1/2008 | Sadatsuki |
| 7,330,511 | B2 | 2/2008 | Maltagliati et al. |
| 7,353,086 | B2 | 4/2008 | Ennis |
| D576,658 | S | 9/2008 | Speggiorin |
| D581,959 | S | 12/2008 | Chan |
| 7,458,736 | B2 | 12/2008 | Woodman |
| D591,325 | S | 4/2009 | Dordick |
| 7,522,834 | B2 | 4/2009 | Heaven et al. |
| D592,231 | S | 5/2009 | Schnell |
| D592,235 | S | 5/2009 | Bryant et al. |
| D596,658 | S | 7/2009 | Dordick |
| D603,442 | S | 11/2009 | Dordick |
| 7,658,556 | B2 | 2/2010 | Johnson |
| 7,661,891 | B2 | 2/2010 | Heibel |
| 7,753,599 | B2 | 7/2010 | Segawa et al. |
| D630,238 | S | 1/2011 | Fukuma et al. |
| D640,304 | S | 6/2011 | Green et al. |
| D640,722 | S | 6/2011 | Green et al. |
| D643,057 | S | 8/2011 | Mendoza et al. |
| 8,014,656 | B2 | 9/2011 | Woodman |
| D646,315 | S | 10/2011 | Orf |
| 8,079,501 | B2 | 12/2011 | Woodman |
| D653,692 | S | 2/2012 | Dordick |
| 8,120,651 | B2 | 2/2012 | Ennis |
| D663,350 | S | 7/2012 | O'Donnell et al. |
| D665,006 | S | 8/2012 | Green et al. |
| 2002/0057294 | A1* | 5/2002 | Ejima et al. .......... 345/792 |
| 2002/0067920 | A1 | 6/2002 | Weng et al. |
| 2003/0063200 | A1 | 4/2003 | Isoyama |
| 2003/0128975 | A1 | 7/2003 | Shevick |
| 2003/0227561 | A1* | 12/2003 | Sakata et al. .......... 348/335 |
| 2004/0004825 | A1 | 1/2004 | Malard et al. |
| 2005/0168567 | A1* | 8/2005 | Boon .................. 348/25 |
| 2005/0200750 | A1 | 9/2005 | Ollila |
| 2005/0206736 | A1 | 9/2005 | Ng et al. |
| 2006/0055786 | A1 | 3/2006 | Ollila |
| 2006/0262214 | A1* | 11/2006 | Koyama et al. .......... 348/335 |
| 2006/0274171 | A1 | 12/2006 | Wang |
| 2007/0070184 | A1* | 3/2007 | Kim et al. .......... 348/14.02 |
| 2007/0111754 | A1 | 5/2007 | Marshall et al. |
| 2009/0109292 | A1 | 4/2009 | Ennis |
| 2011/0280540 | A1 | 11/2011 | Woodman |

FOREIGN PATENT DOCUMENTS

| | | |
|---|---|---|
| CN | 1223768 | 7/1999 |
| DE | 198 31 819 C1 | 7/1998 |
| DE | 20 2004 001 608 U1 | 6/2004 |
| EP | 0 917 359 A1 | 5/1999 |
| EP | 0980181 | 2/2000 |
| EP | 1 944 965 A1 | 7/2008 |
| JP | 61-118076 | 6/1986 |
| JP | 08-223524 | 8/1996 |
| WO | WO 94/26061 | 11/1994 |
| WO | WO 96/38004 | 11/1996 |
| WO | WO 2007/077759 A1 | 7/2007 |

OTHER PUBLICATIONS

Photograph of a Midlandradio goggle mount for a camera. The photograph was taken at the CES Trade Show, Jan. 2010.

Photograph of a Midlandradio goggle mount for a camera with a plug mount inserted into the goggle mount and with a camera showing in the foreground. The photograph was taken at the CES Trade Show, Jan. 2010.

Internet website: https//www.midlandradio.com/Resource_/Product/1390/Detail/LargeImage/Goggle%20Mou . . . , Oct. 18, 2010.

International Application No. PCT/US2008/71661, filed Jul. 30, 2008.

Nov. 2, 2009 world wide web ("http://www.helmkameras24.de/Oregon-Scientific-ATC-9000_c25 . . . ") 2-page printout concerning new item Oregon Scientific ATC 9000.

Nov. 2, 2009 world wide web ("http://www.actioncameras.co.uk/X170") 4-page printout concerning X170 Action Camera and its mounts.

Office action dated Nov. 24, 2011 issued by the Chinese Patent Office for corresponding Chinese Patent Application No. 200880109237.6.

Co-pending Design U.S. Appl. No. 29/423,720, filed Jun. 4, 2012.

Co-pending Design U.S. Appl. No. 29/422,605, filed May 22, 2012.

Oct. 11, 2012 Summons to attend oral hearings concerning corresponding European Pat. Appl. No. 08782542.8.

Sep. 14, 2012 Patent Examination Report No. 1 concerning corresponding Australian Pat. Appl. No. 2008282223.

Supplemental Search Report from the European Patent Office concerning related European Patent Application No. 08782542.8, Nov. 10, 2012.

English language machine translation of JP 08-223524, Aug. 30, 1996.

Drawing of subject matter of a photograph of a Midlandradio goggle mount for a camera. The photograph was taken at the CES Trade Show, Jan. 2010.

Drawing of subject matter of a photograph of a Midlandradio goggle mount for a camera with a plug mount inserted into the goggle mount and with a camera showing in the foreground. The photograph was taken at the CES Trade Show, Jan. 2010.

Drawing of subject matter from a print out from an Internet website: https//www.midlandradio.com/Resource_/Product/1390/Detail/LargeImage/Goggle%20Mou . . . , Oct. 18, 2010.

May 13, 2011 Written Opinion concerning related Singapore Patent Application No. 20100010-4.

* cited by examiner

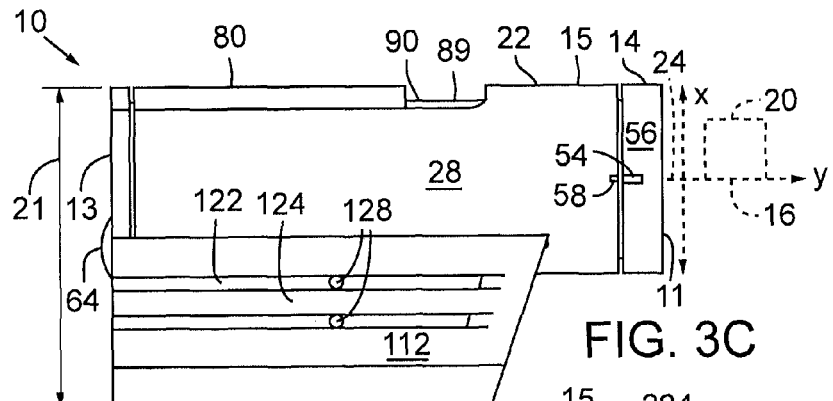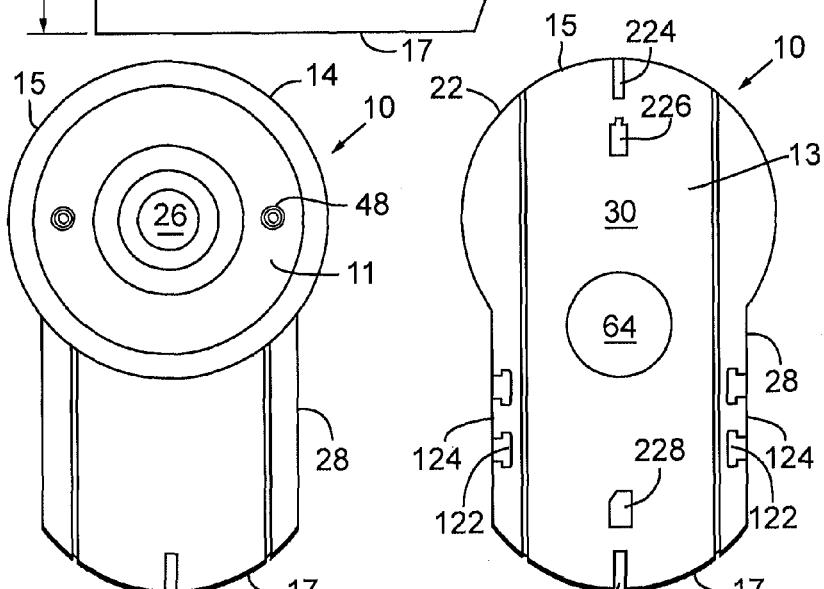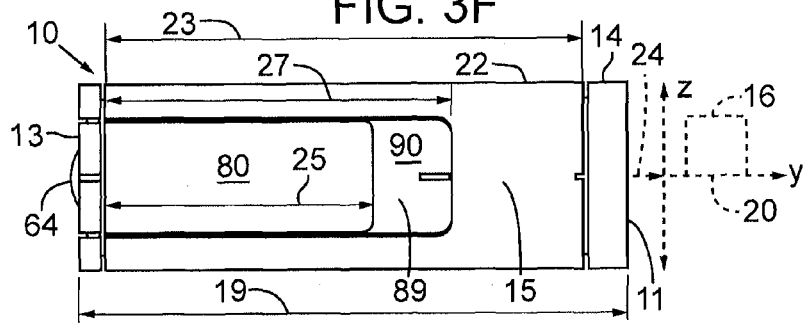

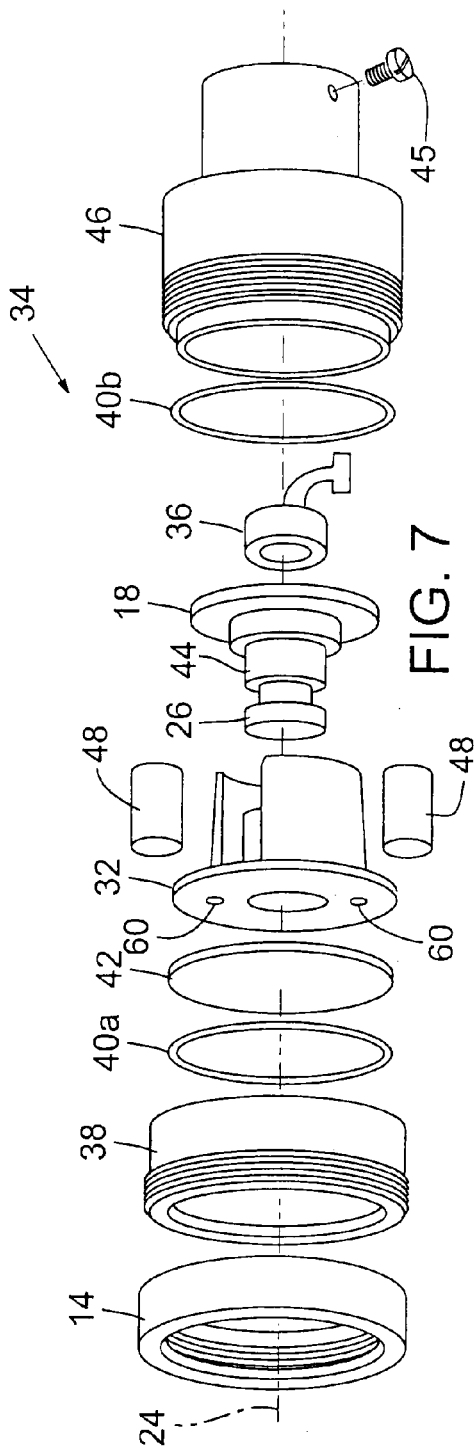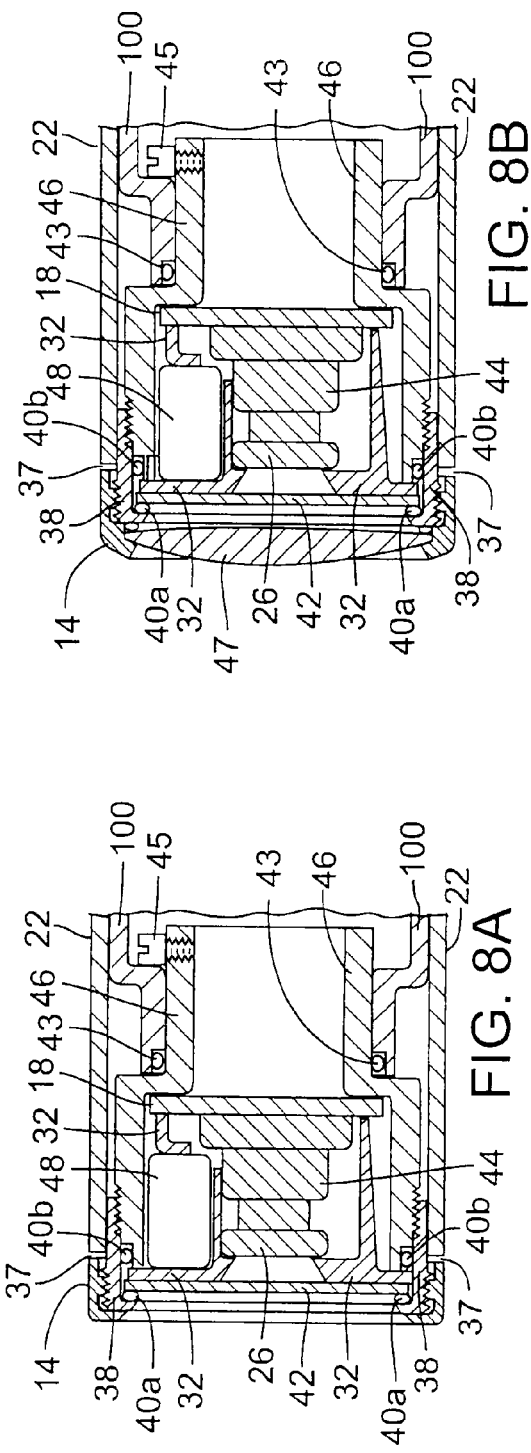

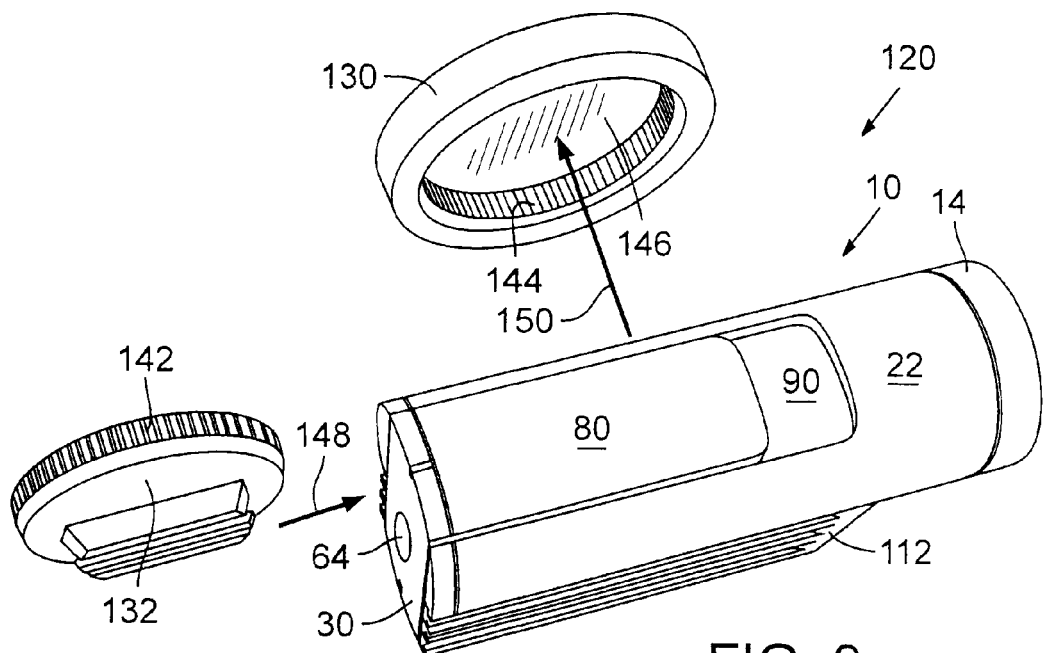
FIG. 9
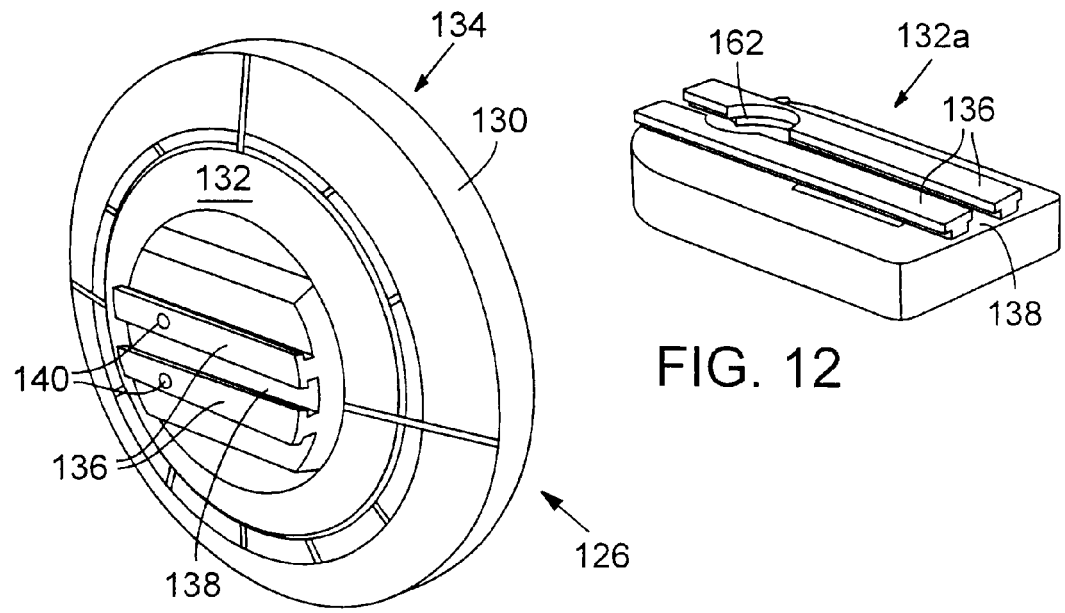
FIG. 10
FIG. 12

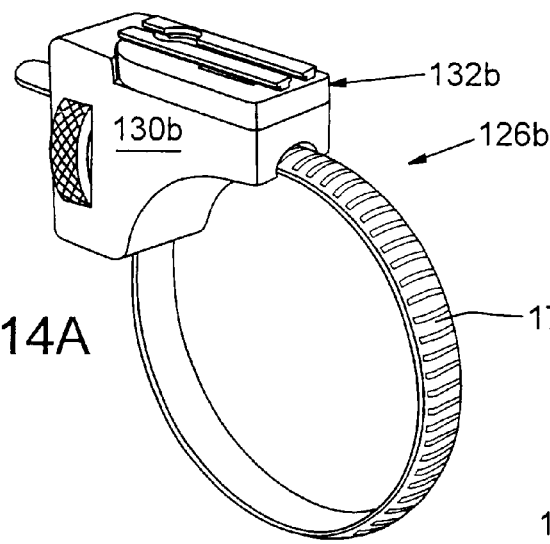
FIG. 14A
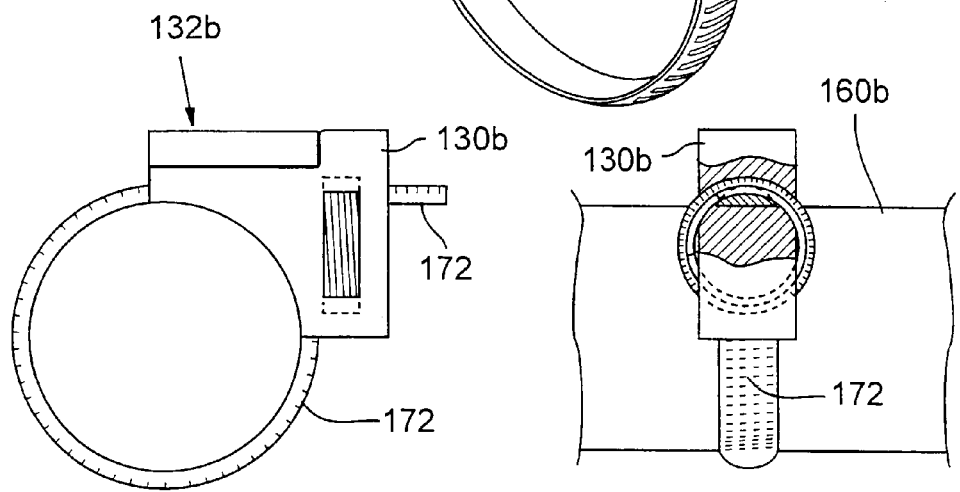
FIG. 14B
FIG. 14C
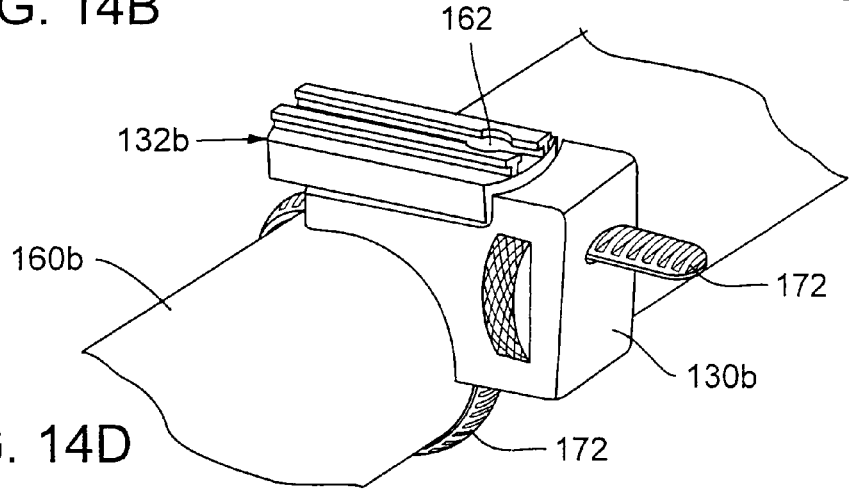
FIG. 14D

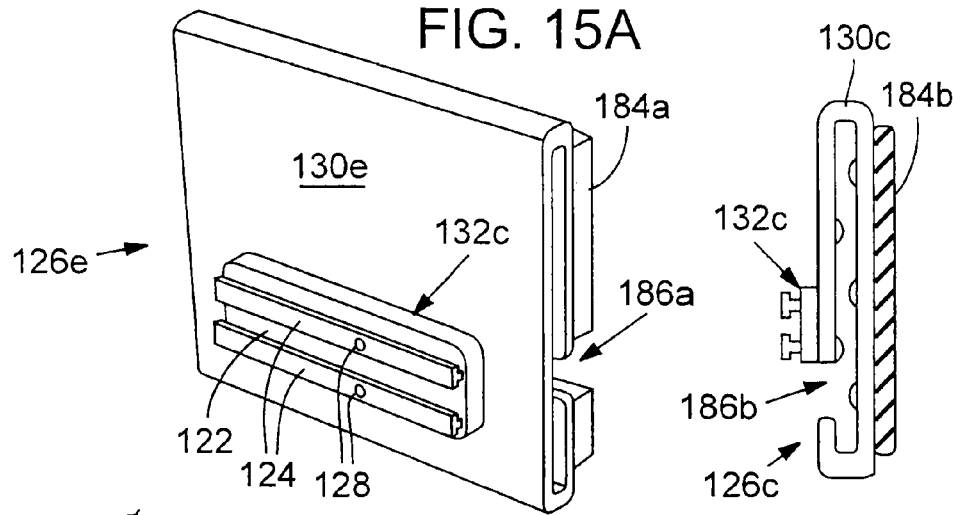
FIG. 15A
FIG. 15B
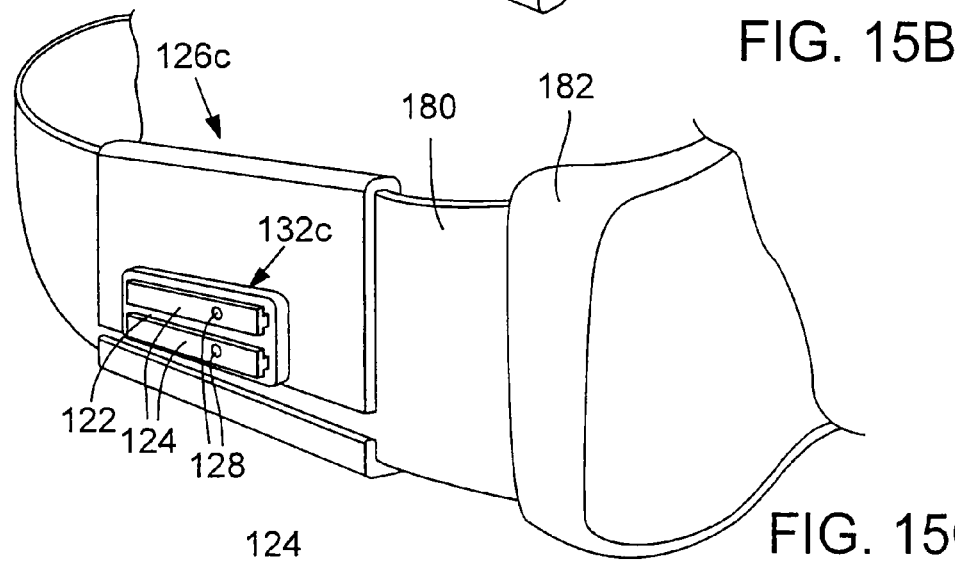
FIG. 15C
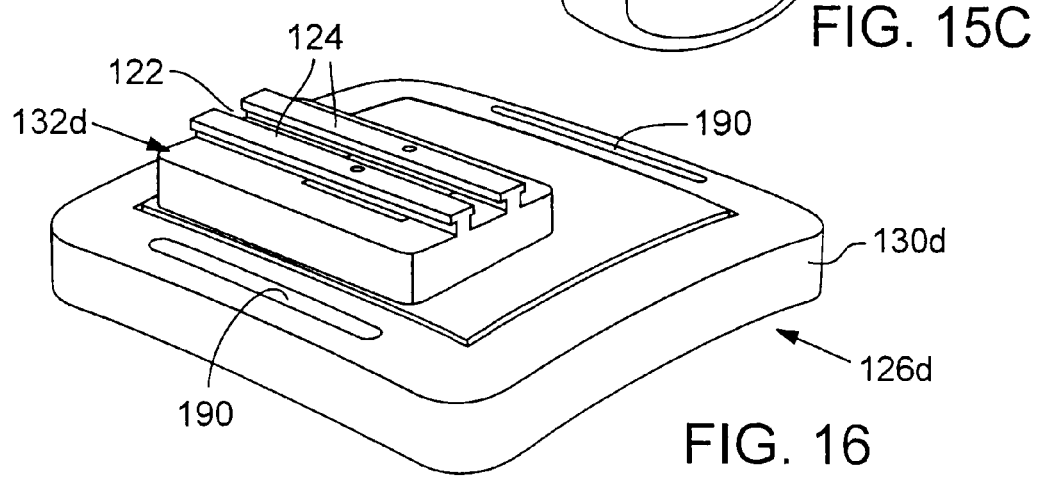
FIG. 16

US 8,792,041 B2

CONTROL SWITCH FOR A PORTABLE DIGITAL VIDEO CAMERA

RELATED APPLICATIONS

This application claims benefit of U.S. Design application Ser. No. 29/322,219, filed Jul. 30, 2008 and International Application No. PCT/US2008/071661, filed Jul. 30, 2008, both of which claim benefit of U.S. Provisional Patent Application No. 60/952,810, filed Jul. 30, 2007.

This application incorporates by reference the U.S. application Ser. No. 29/322,219 for Portable Digital Video Camera, which is now U.S. Pat. No. D 616,006.

TECHNICAL FIELD

The field of invention relates to point-of-view (POV) video cameras or camcorders and, in particular, to an integrated hands-free, POV action sports video camera or camcorder.

BACKGROUND INFORMATION

First-person video cameras are a relatively new product category that have been adapted to capture POV video by action sports enthusiasts in a hands-free manner. Conventional first-person video cameras primarily comprise a lens that must be tethered to a separate digital video recorder or camcorder. FIGS. 1A and 1B present pictorial views of prior art first-person video cameras requiring a tethered lens approach to capturing first-person video recording. FIG. 1A presents a Twenty20™ device, and FIG. 1B presents a Viosport™ device. FIGS. 1C and 1D present pictorial views of prior art video cameras tethered to camcorders for implementing the tethered lens approach to capturing first-person video recording. FIG. 1C and FIG. 1D present Samsung™ devices.

These products are not generally hands-free products, and consumers have been employing their own unique mounting techniques to permit "hands-free" video recording of action sports activities. FIG. 1E presents a pictorial view of a tethered camera attempting to facilitate hands-free POV video recording. FIG. 1E presents a Blackeye™ device. These recent devices attempt to convey image data from "tethered" cameras to separate camcorders through IR signals to eliminate the tethering cables.

More recently, integrated hands-free, POV action sports video cameras have become available. FIGS. 2A and 2B present pictorial views of two prior art products implementing integrated solutions to first-person video recording. These products are still in their infancy and may be difficult to use well.

SUMMARY OF THE DISCLOSURE

A portable digital video camera (or camcorder) includes a camera housing and a lens.

Some embodiments of the portable digital video camera (or camcorder) comprise an integrated hands-free, POV action sports digital video camera (or camcorder).

Some embodiments of the portable digital video camera (or camcorder) or the integrated hands-free, POV action sports digital video camera (or camcorder) include an image sensor for capturing image data.

Some embodiments of the portable digital video camera (or camcorder) or the integrated hands-free, POV action sports digital video camera (or camcorder) include a manual horizon adjustment control for adjusting an orientation of a horizontal image plane recorded by the image sensor with respect to a housing plane of the camera housing.

Some embodiments of the portable digital video camera (or camcorder) or the integrated hands-free, POV action sports digital video camera (or camcorder) include a laser alignment system with one or more laser sources capable of projecting light emissions to define a horizontal projection axis that is coordinated with orientation of the horizontal image plane.

Some embodiments of the portable digital video camera (or camcorder) or the integrated hands-free, POV action sports digital video camera (or camcorder) include a microphone and a manually operable switch for controlling an audio and/or video data capturing operation, the switch having an activator that covers the microphone whenever the switch is in the OFF position.

Some embodiments of the portable digital video camera (or camcorder) or the integrated hands-free, POV action sports digital video camera (or camcorder) include a "quick-release" mounting system that can be used in conjunction with the laser alignment system to adjust the image capture orientation for pitch, yaw, and roll.

Additional aspects and advantages will be apparent from the following detailed description of preferred embodiments, which proceeds with reference to the accompanying drawings.

BRIEF DESCRIPTION OF THE DRAWINGS

FIGS. 3A, 3B, 3C, 3D, 3E, and 3F are, respectively, front perspective, back perspective, side elevation, front elevation, back elevation, and top plan views of an embodiment of an integrated hands-free, POV action sports digital video camera.

FIG. 7 is an exploded view of optical and mechanical components of an integrated hands-free, POV action sports digital video camera.

FIGS. 8A and 8B are fragmentary cross-sectional views of the lens system of the camera of FIG. 7, showing, respectively, a standard lens and the standard lens fitted with a lens filter.

FIG. 9 is a partly exploded view of a versatile mounting system demonstrating ease of adjustment of camera mount orientation coupled with ease of camera detachment with retention of the mount orientation.

FIG. 10 is a front perspective view of a standard mount, employing a rail plug having two rails and two detents.

FIG. 12 is a perspective view of an alternative mount, employing two mounting rails and two detents.

FIG. 14A is a front perspective view of an alternative pole mount system, employing the mount of FIG. 12 and a strap.

FIGS. 14B and 14C are respective side and front views of the alternative pole mount of FIG. 14A.

FIG. 14D is a front perspective view of the alternative pole mount of FIG. 14A locked about a pole.

FIG. 15A is a front perspective view of a goggle mount, employing a strap entrance facing in the opposite direction of the mounting rails.

FIG. 15B is a side view of an alternative goggle mount, employing a strap entrance facing in the same direction of the mounting rails.

FIG. 15C is a fragmentary front perspective view of the alternative goggle mount of FIG. 15B mounted upon a goggle strap.

FIG. 16 is a front perspective view of a vented helmet mount, adapted for employing a strap for attachment to a vented helmet.

DETAILED DESCRIPTION OF PREFERRED EMBODIMENTS

Figure 1A:
FIGS. 1A, 1B, 1C, 1D, and 1E constitute a set of pictorial views of four prior art products implementing a tethered lens approach to capturing first-person video recording.
Figure 1B:
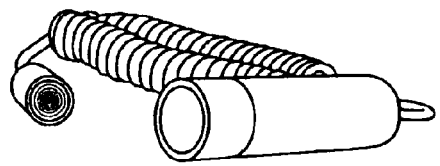
Figure 1C:
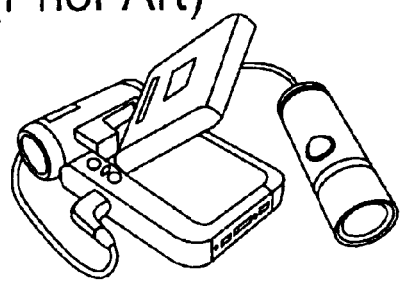
Figure 1D:
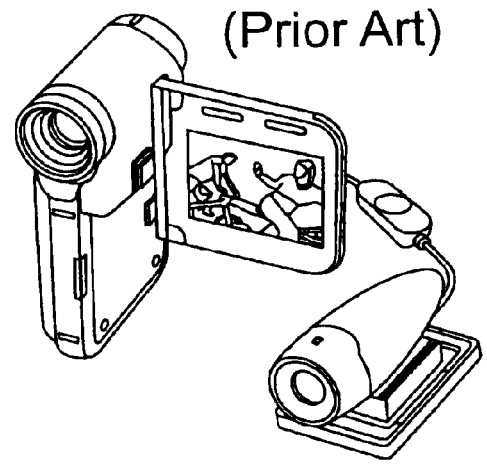
Figure 1E:
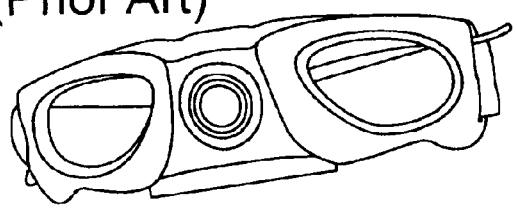
Figure 2A:
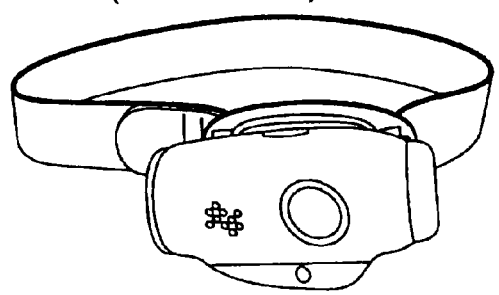
FIGS. 2A and 2B constitute a set of pictorial views of two prior art products implementing integrated solutions to first-person video recording.
Figure 2B:
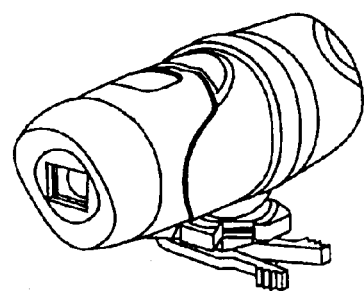
Figure 3A:
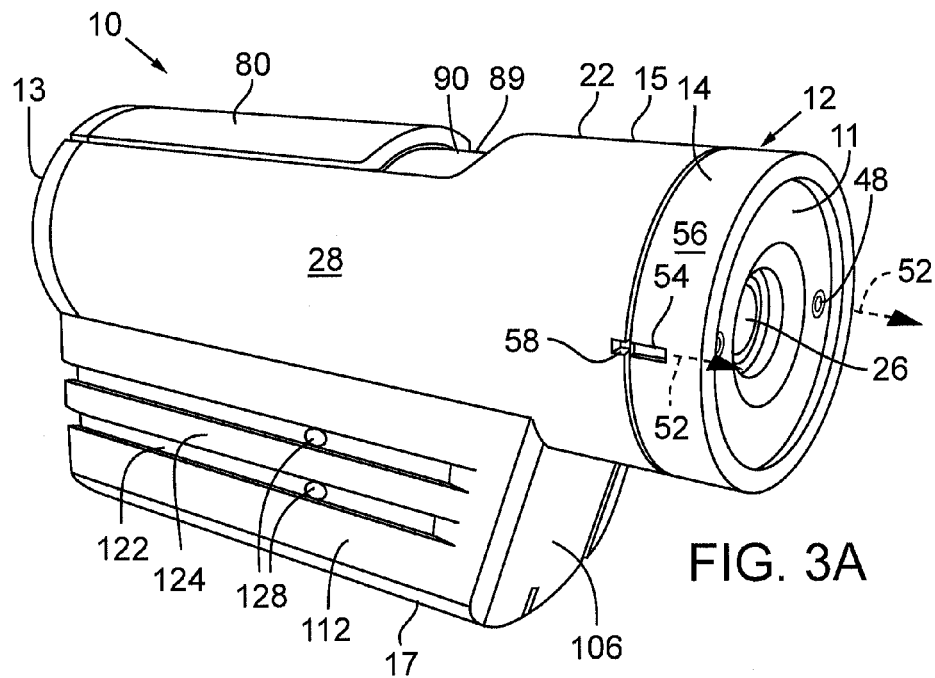
Figure 3B:
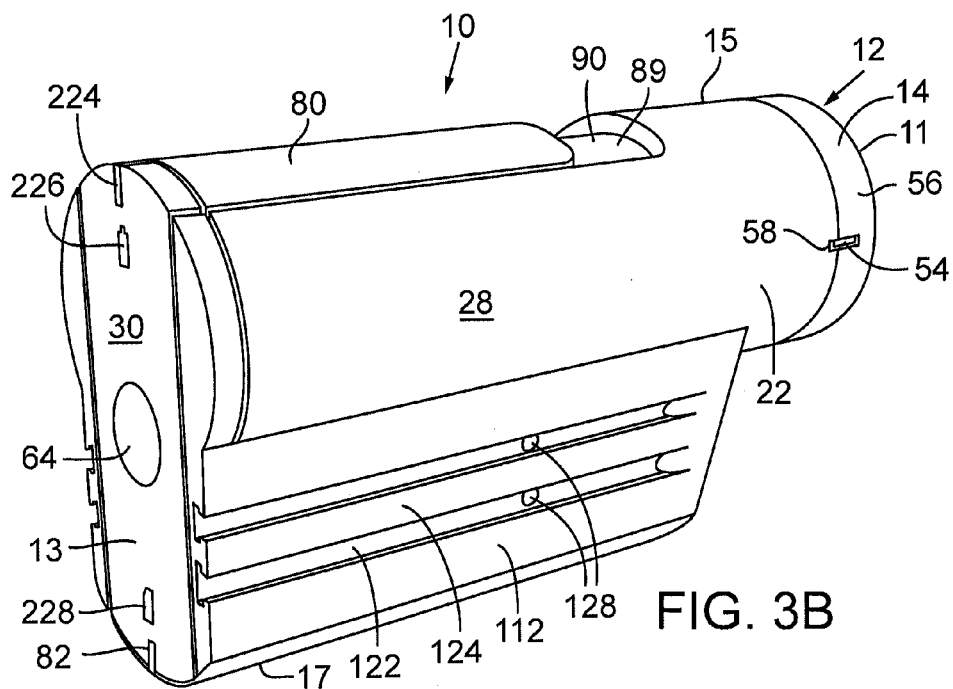
Figure 4A:
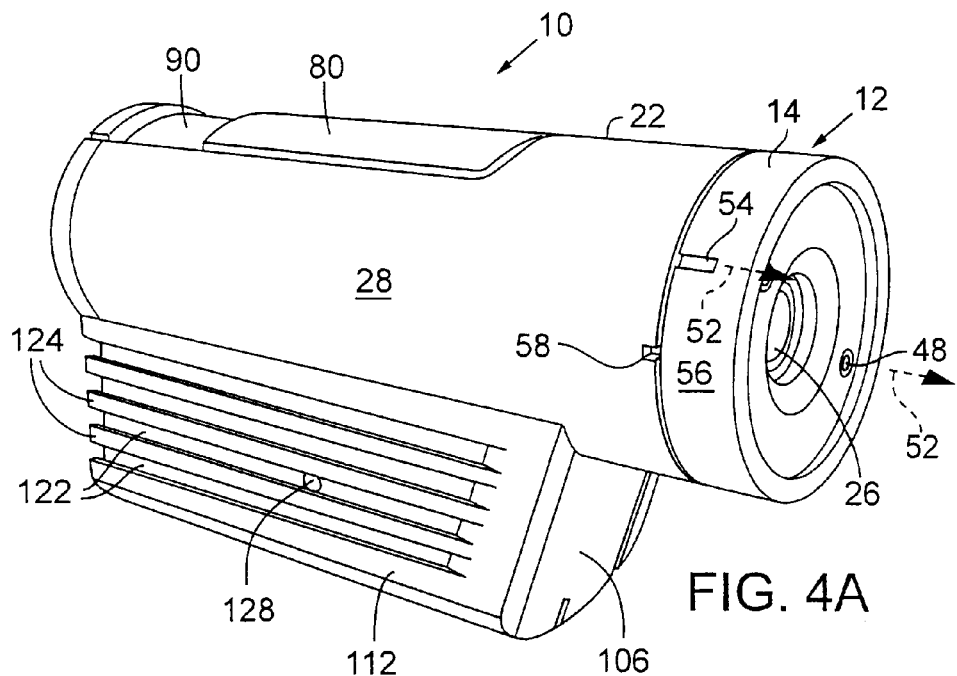
FIG. 4A is a front perspective view of an embodiment of an integrated hands-free, POV action sports digital video camera, showing alternative positioning of a switch and representative alternative rotation of a rotary horizontal adjustment controller.
Figure 4B:
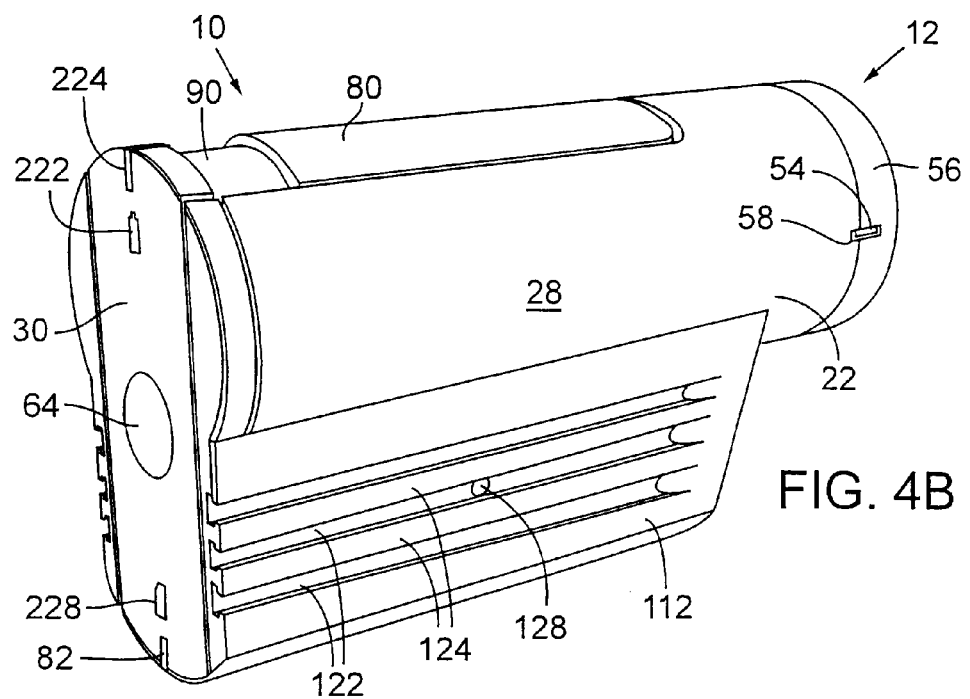
FIG. 4B is a back perspective view of an embodiment of an integrated hands-free, POV action sports digital video camera, showing a representative alternative number of rail cavities and an optional detent within a rail cavity.

FIGS. 3A, 3B, 3C, 3D, 3E, and 3F are, respectively, front perspective, back perspective, side elevation, front elevation, back elevation, and top plan views of an embodiment of an integrated hands-free, POV action sports digital video camera 10, and FIGS. 4A and 4B are front and back perspective views of, respectively, an alternative configuration and an alternative embodiment of the digital video camera 10. For purposes of this description, the term "camera" is intended to cover camcorder(s) as well as camera(s). An example of such a digital video camera 10 is included in the VholdR™ system, marketed by Twenty20, Inc., of Seattle, Wash.

With reference to FIGS. 3A, 3B, 3C, 3D, 3E, and 3F, the camera 10 has: a lens 26, a front 11 that is in proximity to the lens 26; a back 13 that is in opposition to the front 11; a top 15 extending between the front 11 and the back 13 of the camera 10; a bottom 17 extending between the front 11 and the back 13 of the camera, wherein the bottom 17 is in opposition to the top 15; sides 28 extending between the top 15 and the bottom 17; a top length 19 between the front 11 and the back 13; a side height 21 between the top 15 and the bottom 17; a housing length 23; and the top length 19 is greater than the side height 21.

FIGS. 5, 6, 7, 8A, and 8B show optical and mechanical components of the digital video camera 10. With reference to FIGS. 3A-3F, 4A, 4B, 5, 6, 7, 8A, and 8B, some embodiments of the digital video camera 10 include a manual horizon adjustment control system 12 including a manual horizon adjustment control for adjusting an orientation of a horizontal image plane 16 of an image recorded by an image sensor 18 with respect to a housing plane 20 (along a vertical cross-section) of a camera housing 22. An exemplary image sensor 18 may be CMOS image capture card, and provide for minimum illumination of 0.04 Lux @ f/1.2, offer high sensitivity for low-light operation, low fixed pattern noise, anti-blooming, zero smearing, and low power consumption.

With reference to FIGS. 3A, 3C, 3F, 4A, 6, and 7, in some embodiments, the manual horizon adjustment control is a rotary controller 14 that rotates about a control axis 24 such that manual rotation of the rotary controller 14 changes the orientation of the horizontal image plane 16 with respect to the housing plane 20. The manual horizon adjustment control can be used to offset the horizontal image plane 16 with respect to the pitch, yaw, and roll of the mounting position of the camera housing 22.

In some preferred embodiments, the rotary controller 14 is positioned about a lens 26 and cooperates with a lens shroud 32 to support the lens 26 within the camera housing 22 such that manual rotation of the rotary controller 14 rotates the lens 26 with respect to the camera housing 22. In other embodiments, the lens 26 may remain fixed with respect to the camera housing 22 even though the rotary controller 14 rotates around the lens 26. In some embodiments, the lens 26 is a 3.6 mm, ¼" 4G type, glass eye lens with a 90° viewing angle and a focal length covering a large range, such as from arm's length (e.g., 500 mm) to infinity, which focuses visual information onto the image sensor 18 at a resolution, such as at 640×480. Skilled persons will appreciate that a variety of types and sizes of suitable lenses are commercially available.

In some preferred embodiments, the image sensor 18 is supported in rotational congruence with the orientation of the rotary controller 14 such that manual rotation of the rotary controller 14 rotates the image sensor 18 with respect to the housing plane 20 of the camera housing 22. When the image sensor 18 has a fixed relationship with the orientation of the rotary controller 14, the image data captured by image sensor 18 does not require any post capture horizon adjustment processing to obtain play back of the image data with a desired horizontal image plane 16. In particular, the rotary controller 14 can be set to a desired horizontal image plane 16, and the image sensor 18 will capture the image data with respect to the orientation of the horizontal image plane 16. In some embodiments, the image sensor 18 may remain fixed with respect to the camera housing 22 even though the rotary controller rotates around the image sensor 18.

With reference to FIGS. 6, 7, 8A, and 8B, in some embodiments, an exemplary optical assembly 34 shows how the image sensor 18 and the lens 26 may be supported in rotational congruence by the cooperation of the lens shroud 32, an internal rotation controller 36, and the rotary controller 14. In some preferred embodiments, the rotary controller 14 may be separated from the camera housing 22 by a gap 37 to facilitate the rotation of the rotary controller 14 with respect to the camera housing 22.

A lens cap holder 38 may be secured to the rotary controller 14 by screw threads and cooperates with an O-ring 40a and to provide support for a lens cover 42 (such as a piece of glass). A lens holder 44 and a lens assembly holder 46 may also be employed to support the lens 26 in a desired position with respect to the other components in the optical assembly 34.

The lens assembly holder 46 may be secured to the lens cap holder 38 by screw threads and an O-ring 40b. An O-ring or bearings 43 may be employed between the lens assembly holder 46 and the main housing 100 to facilitate the rotation of the lens assembly holder 46 about the control axis 24 with respect to the main housing 100. A set screw 45 may be employed to secure the lens assembly holder 46 of optical assembly 34 to the main housing 100 without impeding the rotation of the lens assembly holder 46 or the components within it. In some embodiments, the rotary controller 14, the lens cap holder 38, the O-ring 40a, the lens cover 42, the lens shroud 32, the laser sources 48, the lens 26, the lens holder 44, the image sensor 18, the internal rotation controller 36, the O-ring 40b, and the lens assembly holder 46 of optical assembly 34 may rotate together. Skilled persons will appreciate that several of these components may be fixed with respect to the camera housing 22 or their synchronized rotation may be relaxed. For example, the lens cover 42, the lens 26, and the lens holder 44 need not rotate.

With reference to FIG. 8B, the rotary controller 14 may support a lens filter or other lens component, or the rotary controller may include screw threads or other means to enable attachment of additional or alternative lens components.

In some embodiments, the rotary controller 14 cooperates with an encoder to orient the image sensor 18 to the desired horizontal image plane 16. Alternatively, the encoder could guide post capture horizon adjustment processing to adjust the horizontal image plane 16 of the captured image so that it is transformed to play back the image data with the encoded horizontal image plane 16.

In some embodiments, the rotary controller 14 is positioned in an arbitrary location away from the lens 26 and/or in an arbitrary relationship with the position of the image sensor 18. In one example, the rotary controller 14 may be positioned on a side 28 of the camera housing 22 or a back door 30 and may remotely control the orientation of the image sensor 18 or may control an encoder. Skilled persons will appreciate that an arbitrarily located manual horizon adjustment control need not be a rotary and may be electronic instead of mechanical.

In some embodiments, the rotary controller 14 provides greater than or equal to 180 degree rotation of the horizontal image plane 16 with respect to the housing plane 20 of the camera housing 22 in each of the clockwise and counter-clockwise directions. In one example, the rotary controller provides 180 degrees plus greater than or equal to six degrees of additional rotation in each direction, providing a 192-degree rotation of the horizontal image plane 16 with respect to the housing plane 20. This adjustability includes embodiments in which the orientation of the rotary controller 14 is in congruence with the orientation of the image sensor 18 as well as embodiments employing an encoder. Preferably, both the lens 26 and the image sensor 18 rotate together 192 degrees within a pivoting hermetically sealed capsule. This means no matter how an operator mounts the digital video camera 10, the image sensor 18 can be rotated to capture a level world.

With reference to FIGS. 4A and 4B, in some embodiments, a rotation indicator 54 is provided on an exterior surface 56 of the rotary controller 14. The rotation indicator 54 may take the form of a horizontal notch or raised bar that may or may not be colored differently from the color of camera housing 22. The camera housing 22 may have a similar or smaller notch or raised bar 58 of the same or different color that is fixed in one position. The dislocation between the rotation indicator 54 and the horizontal notch 58 provides a physical indication of the amount that the rotary controller 14 is displaced from its "home" position with respect to the camera housing 22.

In some preferred embodiments, the rotation indicator 54 and the horizontal notch 58 are in a collinear alignment (in the "home" position) when the horizontal image plane 16 is perpendicular to the housing plane 20. Thus, if the digital video camera 10 were set on a level horizontal surface and the two notches were collinear, the horizontal image plane would be horizontal.

With reference to FIGS. 3A, 3C, 3D, 3F, 4A, 7, and 8 in preferred embodiments, one or more laser sources 48 are fitted within the rotary controller 14, are oriented with the horizontal image plane 16, and are capable of projecting light emission(s) to define a horizontal projection axis or plane 52 that is parallel with or coplanar with the horizontal image plane 16. Thus, manual rotation of the rotary controller 14 changes the orientation of the horizontal projection axis 52 with respect to the housing plane 20 as the orientation of the horizontal image plane 16 is changed with respect to the horizontal projection axis 52. The beam(s) of light forming the horizontal projection axis 52 can be used as a guide by an operator to facilitate adjustment of the horizontal image plane 16 by simple rotation of the rotary controller 14 after the camera housing 22 has been mounted.

In some embodiments, a single laser source 48 may employ beam shaping optics and or a beam shaping aperture, filter, or film to provide a desired beam shape such as a line, lines of decreasing or increasing size, or a smiley face. In some embodiments, only a single beam shape is provided. In some embodiments, multiple beam shapes are provided and can be exchanged such as through manual or electronic rotation of a laser filter. Skilled persons will appreciate that two or more laser sources 48 may be outfitted with beam shaping capabilities that cooperate with each other to provide the horizontal projection axis 52 or an image that provides the horizontal projection axis 52 or other guidance tool.

In some embodiments, two laser sources 48 (or two groups of laser sources) are employed to project two beams of light that determine the horizontal projection axis 52. The two laser sources 48 may be mounted on opposite sides of the lens 26 such that their positions determine a laser mounting axis that bisects the lens 26. In some embodiments, the lens shroud 32 provides support for laser sources 48 such that they are positioned to emit light through apertures 60 in the lens shroud 32 (FIG. 7). In some embodiments, an alternative or additional optical support barrel 32a may support the laser source 48 and the other optical components.

The laser sources 48 may be diode lasers that are similar to those used in laser pointers. The laser sources 48 preferably project the same wavelength(s) of light. In some embodiments, an operator may select between a few different wavelengths, such as for red or green, depending on contrast with the background colors. In some embodiments, two wavelengths may be projected simultaneously or alternately. For example, four laser sources may be employed with red and green laser sources 48 positioned on each side of lens 26 such that red and green horizontal projections axes 52 are projected simultaneously or alternately in the event that one of the colors does not contrast with the background.

In some embodiments, the laser sources 48 may be responsive to a power switch or button 64, which in some examples may be located on the back door 30 of the camera housing 22. A rotation of horizon adjustment control system 12 or the rotary controller 14 may provide the laser sources 48 with an ON condition responsive to a timer, which may be preset such as for five seconds or may be a user selectable time period.

Alternatively, a single press of the button 64 may provide the laser sources 48 with an ON condition with a second press providing an OFF condition. Alternatively, a single press of the button 64 may provide an ON condition responsive to a timer, which may be preset such as for five seconds or may be a user selectable time period. Alternatively, the button 64 may require continuous pressure to maintain the laser sources 48 in an ON condition. The button 64 may also control other functions such as standby mode. Skilled persons will appreciate that many variations are possible and are well within the domain of skilled practitioners.

Skilled persons will also appreciate that any type of video screen, such as those common to conventional camcorders, may be connected to or be a part of camera housing 22. Such video screen and any associated touch display may also be used as feedback for orientation in conjunction with or separately from the laser sources 48. Skilled persons will appreciate that the video screen may take the form of a microdisplay mounted internally to the camera housing 22 with a viewing window to the screen through the camera housing 22 or may take the form of an external LCD screen.

With reference to FIGS. 3A, 3B, 3C, 3F, 4A, 4B, 5, and 6, in preferred embodiments, the digital video camera 10 has a manually operable switch activator 80 that has an activator area that covers a major portion of the surface area at the top 15 of the camera 10. The switch activator 80 also covers a major portion of a slidably engageable surface 89, and the slidably engageable surface covers a major portion of the surface area at the top 15 of the camera 10. Moreover, the switch activator 80 has an activator length 25 that forms a major portion of the length 27 of the slidably engageable surface 89, the activator length 25 also forms a major portion of the housing length 23, the length 27 of the slidably engageable surface 89 also forms a major portion of the top length 19, and the switch activator 80 slides in a direction of travel between the back 13 and the front 11. The manually operable switch 80 controls the recording condition of the image sensor 18 and/or conveyance of the acquired image data to a data storage medium, such as on a two-gigabyte MicroSD card. In some embodiments, the digital video camera 10 is designed to use pulse power to conserve battery life while monitoring the switch activator 80. When the switch activator 80 is positioned to the ON position, the pulse power system is instructed to provide full power to the electronics and begin recording immediately; similarly, when the switch activator 80 is positioned to the OFF position, the pulse power system is instructed to cut power to the electronics and stop recording immediately.

In some preferred embodiments, when the switch activator 80 is slid or toggled, it moves a magnetic reed that is recognized from an impulse power sensor. Once the sensor recognizes the magnetic reed has been toggled to the ON position, the pulse power system is then triggered to power up most or all of the electronics of the digital video camera 10, including all of the electronics required for recording as well as selected other electronics or simply all the electronics. Once full power is provided to the system electronics, a feed from the image sensor 18 begins encoding and writing to the data storage medium. As soon as the first frames are written to the data storage medium, a signal is sent to an LED 82 to indicate via a light pipe 84 that the digital video camera 10 is recording. Thus, activation of the switch activator 80 initiates recording nearly instantaneously.

In some embodiments, the switch activator 80 powers up the electronics and initiates recording from a standby mode such as after the button 64 has been pushed to activate the pulse power mode. In other embodiments, the switch activator 80 powers up the electronics and initiates recording directly without any pre-activation. In some embodiments, a video encoder that cooperates with the image sensor and a microprocessor provides instructions to the video encoder. In some embodiments, the switch activator 80 is adapted to substantially simultaneously control supply of power to the microprocessor, the image sensor, and the video encoder, such that when the switch activator 80 is placed in the ON position the microprocessor, the image sensor, and the video encoder all receive power substantially concurrently and thereby substantially instantaneously initiate a video data capturing operation.

In some embodiments, an audio encoder cooperates with the microphone 90, and the microprocessor provides instructions to the audio encoder. In some embodiments, the switch activator 80 is adapted to substantially simultaneously control the supply of power to the microphone 90 and the audio encoder such that when the switch activator 80 is placed in the ON position, the microprocessor, the microphone, and the audio encoder all receive power substantially concurrently and thereby substantially instantaneously initiate an audio data capturing operation.

In some embodiments, when the switch activator 80 is placed in the OFF position, the microprocessor, the image sensor, and the video encoder all cease to receive power substantially concurrently and thereby substantially instantaneously cease the video data capturing operation. In some embodiments, when the switch activator 80 is placed in the OFF position, the microprocessor, the microphone 90, and the audio encoder all cease to receive power substantially concurrently and thereby substantially instantaneously cease the audio data capturing operation.

In some embodiments, the microprocessor, the image sensor 18, the video encoder, the microphone 90, and the audio encoder all receive power substantially concurrently and thereby substantially instantaneously initiate the video data and audio data capturing operations. In some embodiments, the microprocessor, the image sensor 18, the video encoder, the microphone 90, and the audio encoder all cease to receive power substantially concurrently and thereby substantially instantaneously cease the video data and audio data capturing operations.

In some embodiments, the switch activator 80 controls supply of power to additional electronics such that the additional electronics are deactivated when the switch activator 80 is in the OFF position and such that the additional electronics are activated when the switch activator 80 is in the ON position.

Skilled persons will appreciate that the switch activator 80 may be designed to have more than two slide settings. For example, in addition to ON and OFF settings for recording, switch activator 80 may provide an intermediate setting to activate laser sources 48, to activate one or more status indicators, or initiate other functions in the digital video camera 10.

The use of a magnetic reed switch as an embodiment for the switch activator 80 prevents water or other fluids from entering through the camera housing 22. Skilled persons will appreciate that other waterproof ON/OFF switch designs are possible. In preferred embodiments, digital video camera 10 also employs a waterproof microphone 90, such as an omni-directional microphone with a sensitivity (0 dB=1V/Pa, 1 KHz) of −44±2 dB and a frequency range of 100-10,000 Hz, for capturing audio data and providing it to the data storage medium or to a second data storage medium. Alternatively, the camera housing 22 may include breathable, watertight materials (such as GoreTex™) to prevent the egress of water without requiring a waterproof microphone 90. Skilled persons will appreciate that microphones 90 with a large variety of operational parameters are commercially available or can be manufactured to suit desired criteria.

In some embodiments, the microphone 90 is positioned beneath the switch activator 80 such that the switch activator 80 covers the microphone 90 whenever the switch activator 80 is in the OFF position and such that the switch activator 80 exposes the microphone 90 whenever the switch activator 80 is in the ON position. The audio data capturing operation is preferably deactivated when the switch activator 80 is in the OFF position and that the audio data capturing operation is preferably activated when the switch activator 80 is in the ON position. The ON and OFF conditions of the audio data capturing operation may be controlled by the switch activator 80 in conjunction with the ON and OFF conditions of the video capturing operation.

Figure 5:
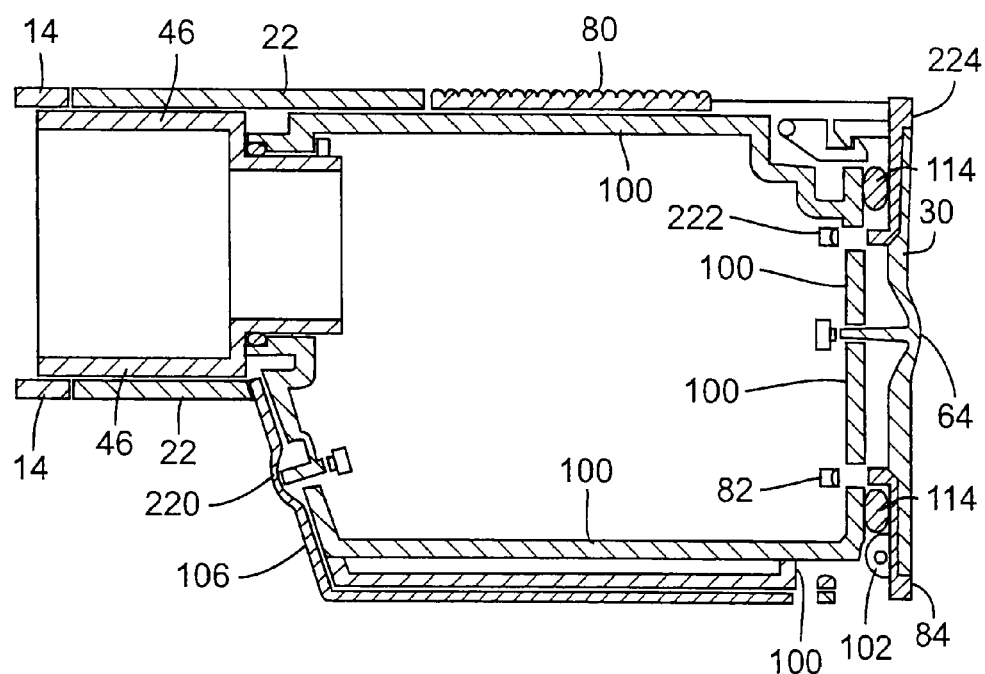
FIG. 5 is a cross-sectional side view of an embodiment of an integrated hands-free, POV action sports digital video camera.
Figure 6:
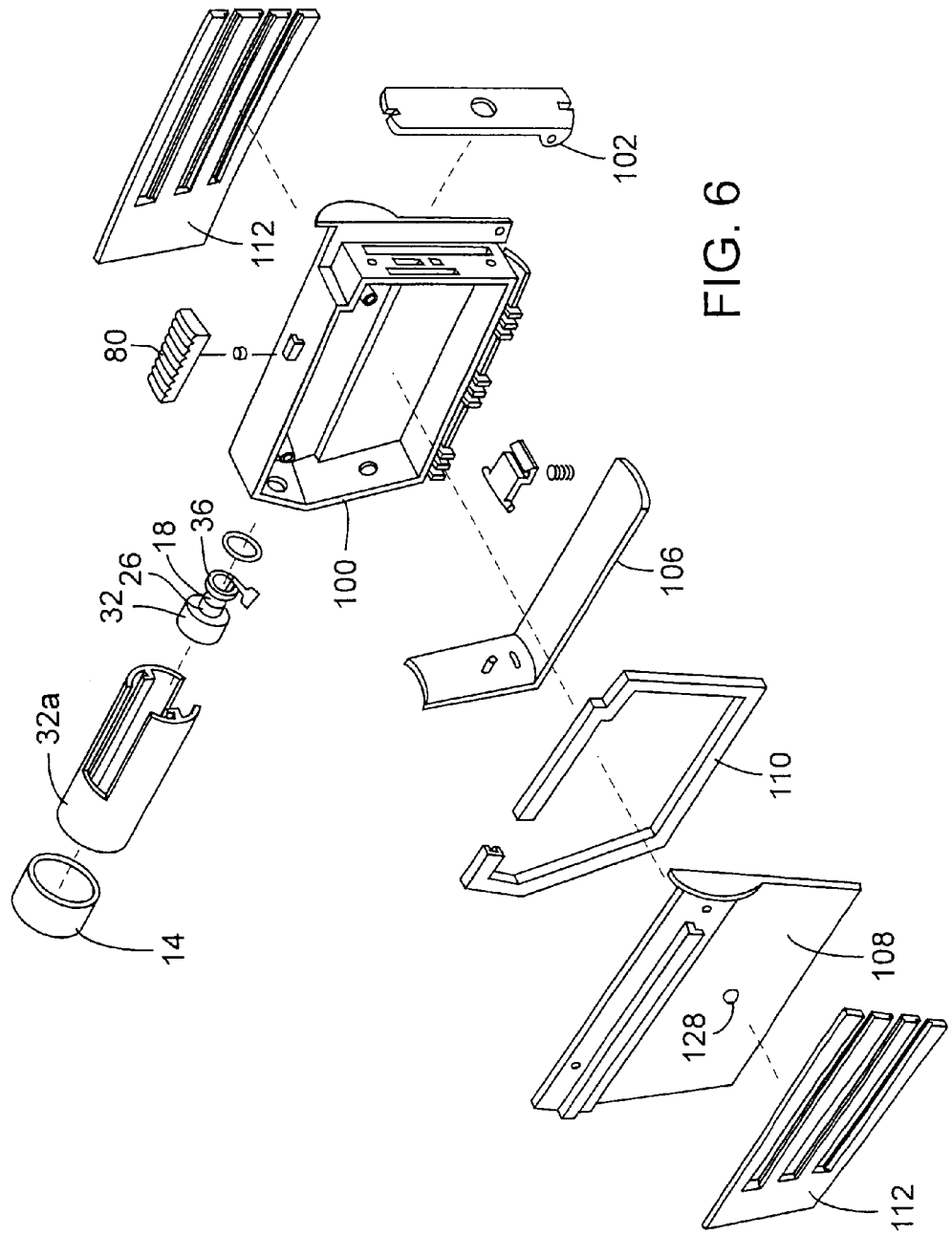
FIG. 6 is an exploded view of an embodiment of mechanical components of an integrated hands-free, POV action sports digital video camera.
Figure 11B:
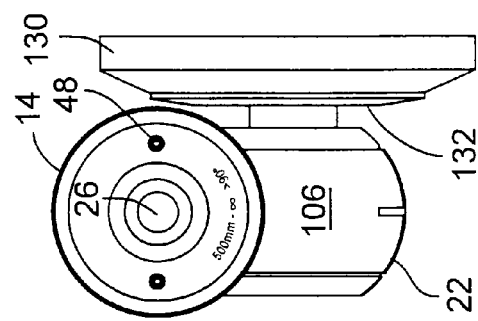
FIGS. 11A, 11B, 11C, and 11D are, respectively, back elevation, front elevation, side elevation, and top plan views of the versatile mounting system, demonstrating the matable relationship between the camera of FIGS. 3A-3E with the standard mount shown in FIG. 10.
Figure 11C:
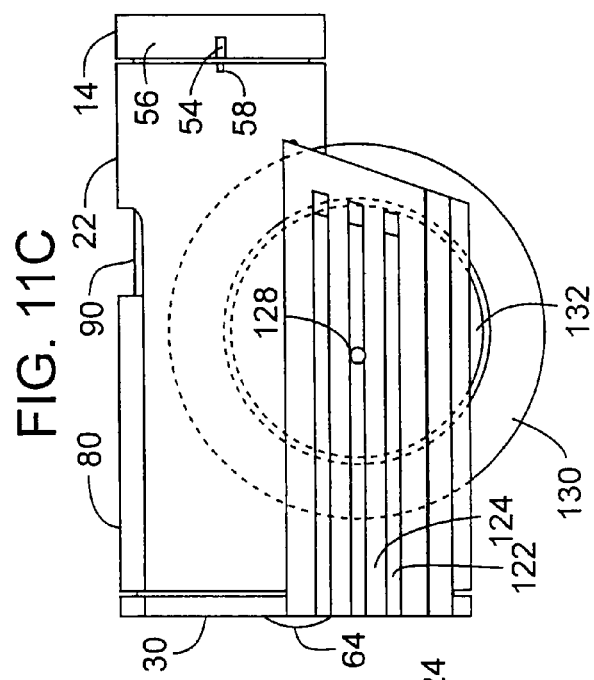
Figure 11D:
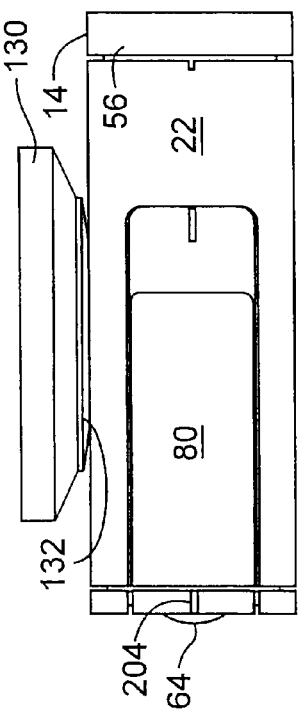
Figure 11A:
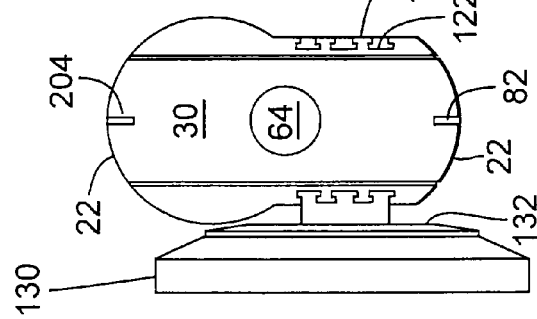
Figure 13A:
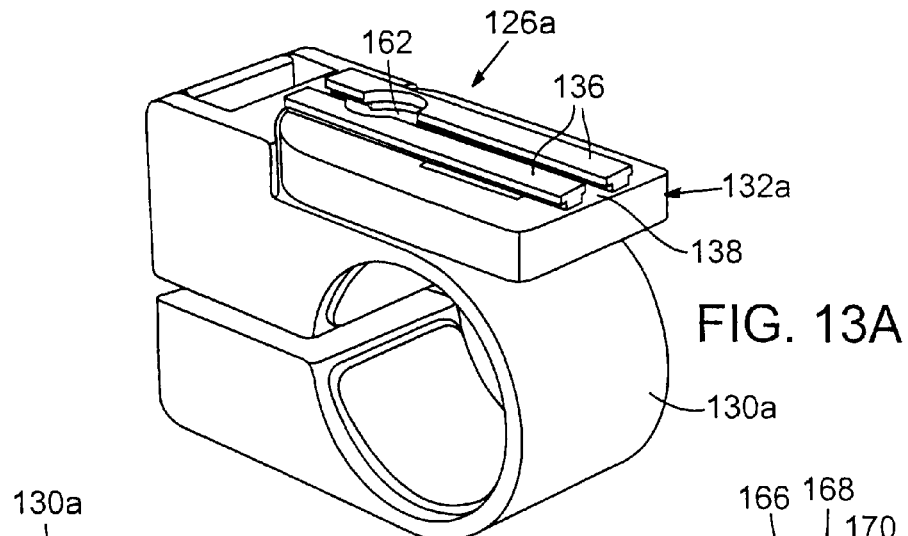
FIG. 13A is a front perspective view of a pole mount system, employing the mount of FIG. 12.
Figure 13B:
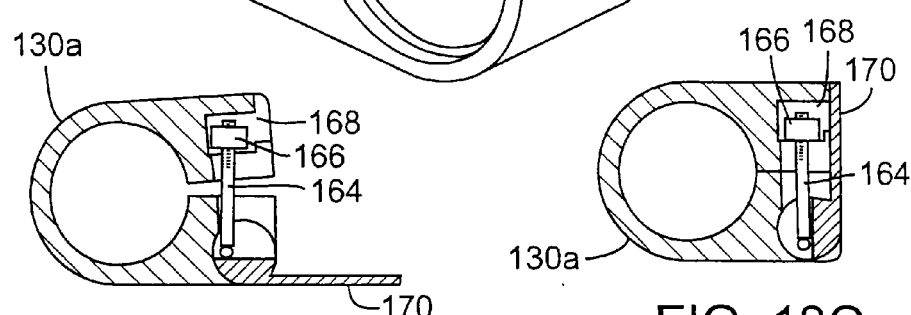
FIGS. 13B and 13C are cross-sectional side views of a pole mount system showing, respectively, unlocked and locked configurations.
Figure 13C:
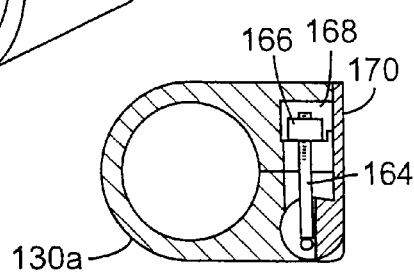
Figure 13D:
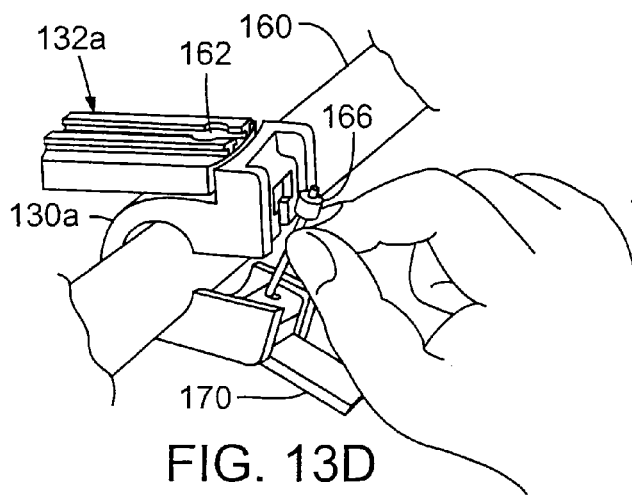
FIGS. 13D and 13E are front perspective views of a pole mount system showing, respectively, unlocked and locked configurations about a handle bar.
Figure 13E:
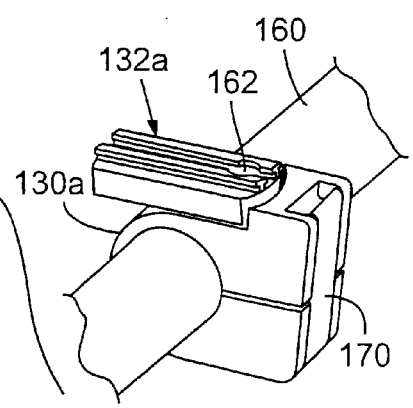

With reference to FIGS. 5 and 6, in some embodiments, the camera housing 22 includes a main housing 100 that supports the switch activator 80, a front and bottom trim piece 106, and the back door 30 which is connected to the main housing 100 through a hinge 102. In some embodiments, the back door 30 may be removable through its hinge 102 to allow connection of accessories to the main housing 100 for extended functionality. The back door 30 may provide an area of thinner material to permit compression of the button 64. Gaskets 114 may be seated between the main housing 100 and the back door 30 to provide waterproofing. A housing cover 108 may be connected to the main housing 100 through a rubber gasket 110 that also enhances the waterproof characteristics of the camera housing 22.

Side caps 112 may be ultrasonically welded to the exterior surfaces of the housing cover 108 and the lower portion of the main housing 100, which form the lower portions of the sides 28 of the camera housing 22. In some embodiments the camera housing 22 is made from brushed aluminum, baked fiberglass, and rubber. In particular, the main housing 100, the housing cover 108, and the side caps 112 may be made from aluminum. The front and bottom trim piece 106 may also be ultrasonically welded to the main housing 100.

With reference to FIGS. 3A, 3B, 4A, 4B, 6, and 9, in preferred embodiments, the digital video camera 10 includes part of a mounting system 120 that has two or more housing rail cavities 122 and two or more interleaved housing rails 124 on each side 28 of camera housing 22 for engaging a versatile mount 126. An example of such a mounting system 100 is the TRail™ mounting system, marketed by Twenty20, Inc, of Seattle, Wash.

The housing rail cavities 122 and housing rails 124 may be formed by cut outs in the side caps 112 that are mounted to the main housing 100. In some embodiments, digital video camera 10 is bilaterally symmetrical and has an equal number of housing rail cavities 122 on each of the side caps 112 and an equal number of housing rails 124 on each of the side caps 112. In some embodiments, digital video camera 10 may for example provide two housing rail cavities 122 (such as shown in FIGS. 3A and 3B) or three housing rail cavities 122 in each side cap 112 (such as shown in FIGS. 4A and 4B). Skilled persons will appreciate, however, that in some embodiments, digital video camera 10 need not be symmetrical and may have an unequal number of rail cavities 122 on its side caps 112.

In some embodiments, the rail cavities 122 have a "T"-like, wedge-like, or trapezoid-like cross-sectional appearance. Skilled persons will appreciate that the dimensions of the stem or lateral branches of the "T" can be different. For example, the stem can be thicker than the branches, or one or more of the branches may be thicker than the stem; similarly, the stem can be longer than the branches, and one or more of the branches may be longer than the stem. The cross-sectional shapes may have flat edges or corners, or the edges or corners may be rounded. Skilled persons will also appreciate that numerous other cross-sectional shapes for the rail cavities are possible and that the cross-sectional shapes of different housing rail cavities 122 need not be the same whether in the same side cap 112 or in different side caps 112. Similarly, the housing rail cavities 122 may have different lengths and the housing rails 124 may have different lengths. The bottom of trim piece 106 may be alternatively or additionally fitted with housing rails 124.

In some embodiments, one or more of the housing rail cavities 122 may contain one or more bumps or detents 128. In some embodiments, each side 28 of camera housing 22 contains at least one bump or detent 128. In some embodiments, each housing rail cavity 122 contains at least one bump or detent 128. In some examples, however, only a single housing rail cavity 122 on each side 28 contains a bump or detent 128. Skilled persons will appreciate that the different sides 28 need not contain the same number of nubs or detents 128.

FIG. 9 shows a mount base 130 and a rail plug 132 that fit together to form a flat surface mount 134 shown in FIG. 10. FIGS. 11A-11D (FIG. 11) depict different views of the camera housing 22 mated with the flat surface mount 126. With reference to FIGS. 9-11, the rail plug 132 contains one or more mount rails 136 that are adapted to mate with the housing rail cavities 122 on camera housing 22. Similarly, the rail plug 132 contains one or more mount rail cavities 138 that are adapted to mate with the housing rails 124 on camera housing 22. The mount rails 136 may have the same or different cross-sectional shapes as those of housing rails 124, and the mount rail cavities 138 may have the same or different cross-sectional shapes as those of the housing rail cavities 122. In some preferred embodiments, the rails 124 and 136 and cavities 122 and 138 have the same cross-sectional profiles.

In some embodiments, one or more of the mount rails 136 on the rail plug 132 may contain one or more detents or bumps 140. In some embodiments, each mount rails 136 contains at least one detent or bump 140. In some examples, however, only a single mount rail 136 contains a detent or bump 140. The detents or bumps 140 are adapted to mate with the bumps or detents 128 such that if the camera housing 22 has detents 128 then the rail plug 132 has bumps 140 or if the camera housing 22 has bumps 128 then the rail plug 132 has detents 140. Skilled persons will appreciate that in some alternative embodiments, the housing rails 124 have the bumps or detents 128 and the mount rail cavities 138 have the detents or bumps 140.

The versatile mounting system 120 provides for ease of mounting and orientation of the digital video camera 10 with ease of detachment of the digital video camera 10 with retention of the mounted orientation. In some embodiments, the base mount 130 may have a very small footprint and may be attached to a surface with an adhesive pad designed for outdoor use. After the base mount 130 has been attached to a surface, the rail plug 132 can be detached from the base mount 130.

In some embodiments, the rail plug 132 has a circumferential saw-toothed edge 142 that is mated to a saw-tooth-receiving inside edge 144 of a base mount cavity 146 adapted to receive the rail plug 132. In some embodiments, the rail plug 132 has a compression fit within the base mount 130. In some embodiments, hook and loop double-toothed Velcro™ may be used instead of or in addition to a compression fit technique to further secure the rail plug 132 within the base mount 130.

The mount rails 136 of the rail plug 132 can slide into the housing rail cavities 122 of the camera housing 22 as the mount rail cavities 138 of the rail plug 132 slide onto the housing rails 124 of the camera housing 22 as indicated by arrow 148 to secure the rail plug 132 to the camera housing 22. The mated detents and bumps 128 and 140 can be engaged to prevent unintended lateral movement of the rail plug 132 with respect to the camera housing 22. The rail plug 132 with the attached digital video camera 10 can be rotated from zero to 360 degrees within a plane perpendicular to the base mount 130 to capture a desired viewing angle. Then, the rail plug 132 can be inserted or re-inserted into the base mount 130 as indicated by arrow 150. FIG. 11 shows from several different views how the mated digital video camera 10, the rail plug 132, and the mount base 130 appear when they are mated together.

In some embodiments, the rail plug 132 and base mount 130 may be made from a hard, but flexible material such as rubber or a polymer with similar properties, but skilled persons will appreciate that the rail plug 132 and base mount 130 may be made from a hard or soft plastic. As the base mount 130 can be flexible, it can be attached to a variety of surfaces such as the surfaces of helmets, snowboard decks, skis, fuel tanks, windows, doors, vehicle hoods, etc. The material and flexibility of the material of the flat mount 126 may provide a "rubber" dampening affect as well as enhance rail sliding, rail engagement, and plug engagement. The mounting system 120 may also include a runaway leash (not shown).

When recording of an activity is completed, the rail plug 132 with the attached digital video camera 10 may be disengaged from the base mount 130 for safe storage or data uploading. The base mount 130 can be left attached to the surface and need not be re-attached and/or re-adjusted. Alternatively, the camera housing 22 may be disengaged from the rail plug 132, leaving the rail plug 132 engaged with the base mount 130 so that the original orientation of the mount rails 136 of the rail plug 132 is maintained to permit quick reattachment of the digital video camera 10 without requiring its orientation to be re-adjusted to the base mount 130 or the person, equipment, or vehicle to which the base mount 130 is mounted.

FIG. 12 shows an alternative rail plug 132a; and FIGS. 13A, 13B, 13C, 13D, and 13E (FIG. 13) show several views of the rail plug 132a with an alternative base mount 130a, including locked and unlocked configurations, to form a pole mount 126a for mounting on a pole 160 such as handle bars. With reference to FIGS. 12 and 13, the rail plug 132a may be used as a stand-alone mount with an adhesive backing or it may be used in conjunction with or integrated into one or more varieties of base mounts 130a. The rail plug 132a may be attached to the base mount 130a through the use of an adhesive mounting, through the use of Velcro™, through the use of a screw, through the use of other conventionally known means, or combinations thereof. The mount rails 136 may be formed to provide an aperture 162 to provide access for a screw and screwdriver to mount the rail plug 132a onto base mount 130a.

The base mount 130a is configured to open and close around poles 160, particularly poles of standardized recreational equipment and especially such poles having small diameters such as 1-1.5 inches (2.5-3.8 cm). In some embodiments, the base mount 130a has a locking pin 164 with a head 166 that can be secured within a lock chamber 168. The locking pin 164 increases compression against the pole 160 to prevent the base mount 130a from rotating around the pole 160 after its desired positioned is established. The base mount 130a may also be provided with a pin door cover 170 to prevent debris from accessing the locking pin 164 or the lock chamber 168.

FIGS. 14A, 14B, 14C, 14D, and 14E (FIG. 14) show several views of a rail plug 132b with an alternative base mount 130b, including a strap 172, to form a pole mount 126b for mounting on a pole 160b such as a roll cage, a windsurfing mast, or a hang glider support. With reference to FIG. 14, in some embodiments, the strap 172 is large enough to accommodate poles 160b having a diameter up to four inches (12 cm) or larger. In some embodiments, a dial 174 may be employed to tighten and loosen the strap 172. In other embodiments, the dial 174 controls the swivel of the rail plug 132 with respect to the base mount 130b so that the side-to-side angle of the digital video camera 10 can be adjusted. As with the rail plug 132a, the rail plug 132b may be attachable to the base mount 130b or may be integrated with it.

FIGS. 15A, 15B, and 15C (FIG. 15) show one view of a rail plug 132e and show several views of a rail plug 132c with an alternative base mount 130c to a band or strap mount 126c for mounting on a belt, strap, or band 180, such as the band 180 of a pair of goggles 182. As with previous embodiments, the rail plugs 132e and 132c may be attachable to the base mount 130c or may be integrated with it. With reference to FIG. 15A, the base mount 130c has a dampener 184a and a strap entrance 186a on an interior side of the base mount 130c, i.e., facing in the opposite direction of the mounting rails 136. The dampener 184a may be made from rubber or other suitable cushioning material to cushion a user's head away from the digital video camera.

With reference to FIG. 15B, the base mount 130c has a dampener 184b on an interior side of the base mount 130c, i.e., facing in the opposite direction of the mounting rails 136. However, the base mount 130c has a strap entrance 186b on an exterior side of the base mount 130c, i.e., facing in the same direction of the mounting rails 136. FIG. 15C shows the base mount 130 of FIG. 15B mounted upon the strap 180 of the goggle 182. Skilled persons will appreciate that the rail plug 132a can be substituted for the rail plugs 132e or 132c.

FIG. 16 shows a rail plug 132d with an alternative base mount 130d to a helmet mount 126d for mounting on a vented helmet. The helmet mount 126 includes one or more slots 190 through which a strap can be used to secure the base mount 130d to a helmet through vent slots in the helmet. Skilled persons will appreciate that the rail plug 132a can be substituted for the rail plug 132d.

Figure 17:
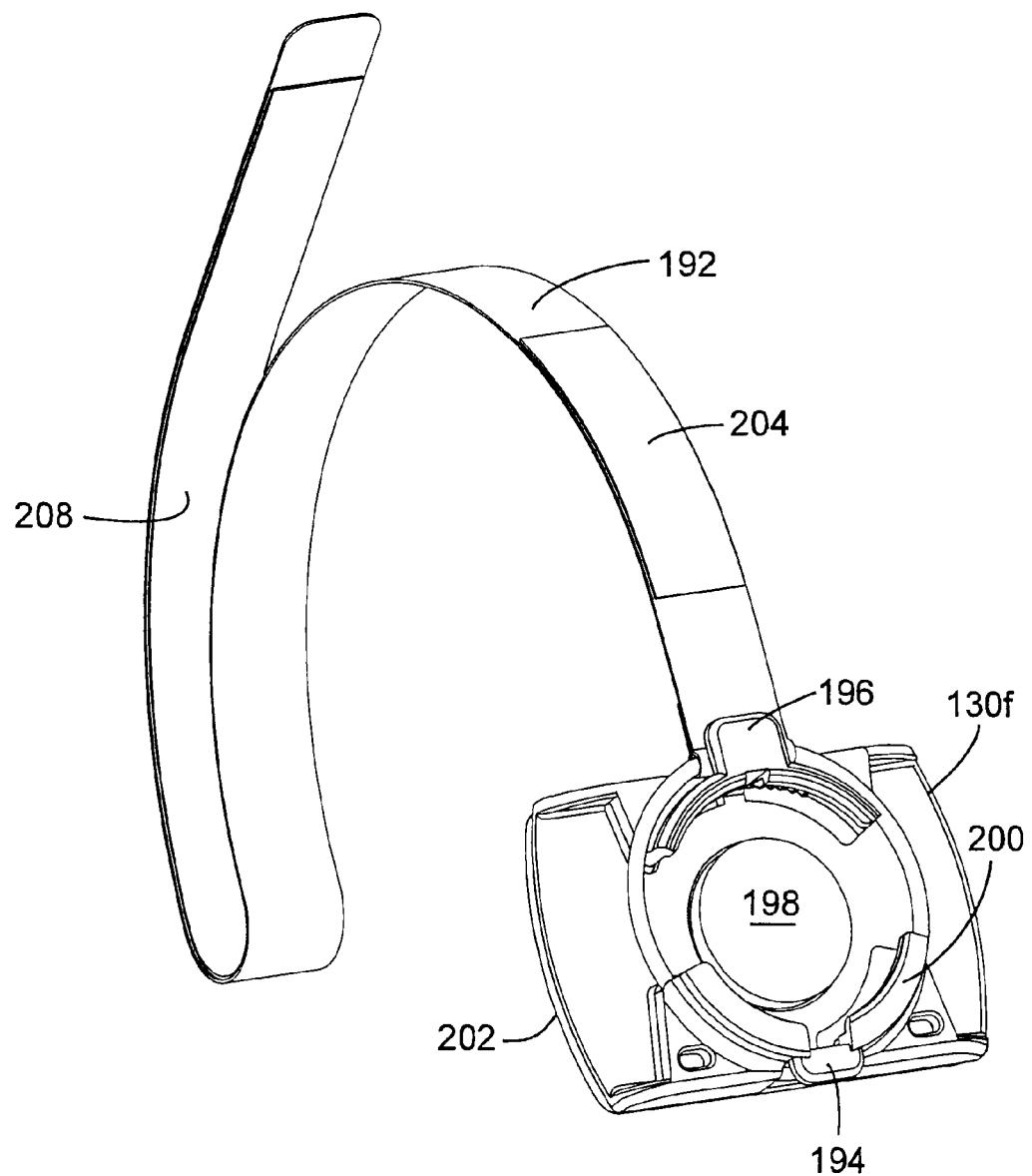
FIG. 17 is a front perspective view of another alternative goggle mount, adapted for employing a strap for attachment to a goggle strap.

FIG. 17 is a front perspective view of another alternative goggle base mount 130f, adapted for employing a strap 192 for attachment to a goggle strap 180. The strap 192 can be looped through buckles 194 and 196 to secure the base mount 130f to the goggle strap 180. The base mount 130f is adapted to receive the circular rail plug 132 (of FIG. 10) that permits 360-degree rotation of the mounting rails 136. Such embodiments permit a user adjust the angle of the digital video camera 10 to be different than the vertical viewing angle of the user. For example, the user can be viewing down at the ground while the digital video camera 10 (and its image sensor 18) captures images straight ahead. In some embodiments, the base mount 130f may include pads 198 and 202 to dampen against vibrations and may include retaining tabs 200 to prevent the rail plug 132 from being inadvertently jarred loose. The strap 192 may also or alternatively include pads 204 and 208.

Figure 18:
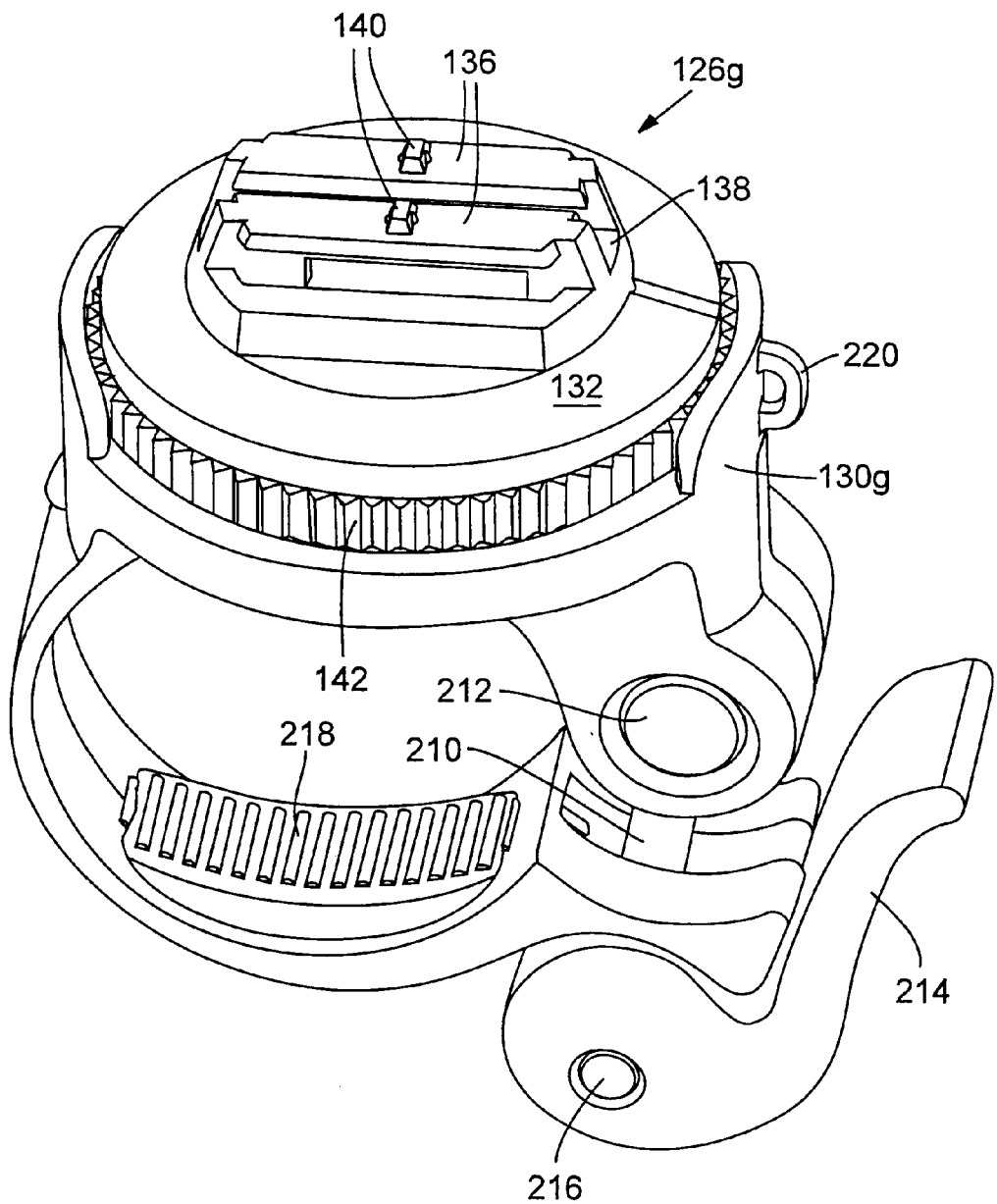
FIG. 18 is a front perspective view of an alternative pole mount system, employing the rail plug of FIG. 10.

Skilled persons will appreciate that base mounts 130a through 130d can also alternatively be configured to receive a round rail plug 132 (of FIG. 10) that permits 360-degree rotation of the mounting rails 136. For example, FIG. 18 shows an alternative pole mount 126g having a base mount 130g adapted to receive the circular rail plug 132 that permits 360-degree rotation of the mounting rails 136. Such embodiments can facilitate compensation for handle bars or other poles 160 or 160b that may be angled backward or forward.

In some embodiments, the base mount 130g has a different locking mechanism than that of base mount 130a (FIG. 13). For example, in some embodiments, a locking pin 210 is attached by a hinge 212 to the base mount 130g, and the locking pin 210 is also attached at its other end to a pin door cover 214 through a hinge 216. The locking pin 210 cooperates with the hinge door cover 214 to increase compression against the pole 160 to prevent the base mount 130g from rotating around the pole 160 after its desired position is established. Skilled persons will appreciate that the base mount 130a may alternatively employ this locking mechanism. In some embodiments, the base mounts 130a and 130g include a pole grip 218 to help maintain a preferred orientation of the base mounts 130a and 130g with respect to the pole 160. In some embodiments, base mounts 130 and 130a-130g may include a leash ring 220 adapted to receive a lease line that may be attached to an associated rail plug 132 (132a-132d), the digital video camera 10, or the operator.

With reference again to FIGS. 3B, 3E, and 5, the button 64 (or an additional button 200) may control one or more status indicators such as the LED 82 that indicates via the light pipe 84 that the digital video camera 10 is recording. The button 64 (or an additional button 220) may, for example, also control operation of an LED 222 that indicates through a light pipe 224 the power status of a battery (not shown). In some embodiments, a single push controls two or more status indicators (or all of the status indicators, and may control the laser sources 48 and a recording standby mode as well).

In some embodiments, the status indicators may provide a different color depending on the status of the item in question. In some embodiments, green, yellow, and red LEDs are used to indicate whether the battery is completely charged, half-charged, or nearly depleted. Similarly, in some embodiments, green, yellow, and red LEDs are used to indicate whether the SD memory card is nearly empty, half-empty, or nearly full. In other embodiments, green light indicates greater than or equal to 80% space or charge, yellow light indicates greater than or equal to 30% space or charge, and red light indicates less than 30% space or charge. Skilled persons will appreciate that the number and meaning of colors can be varied. The camera housing 22 may provide symbols indicating what items the light pipes 84 and 224 designate, such as battery symbol 226 and memory card symbol 228 on the door 30.

To facilitate an easier and more manageable process for the video once it has been recorded, the digital video camera 10 may be designed to automatically segment the video into computer and web-ready file sizes. The segment can be automatically determined by the hardware during the recording process without intervention by the user. In some embodiments, software will automatically close a video file and open a new file at predefined boundaries. In some embodiments, the boundaries will be time-based, for example, ten minutes for each segment, or size-based, for example 10 MB for each segment. Additionally, the segmentation process may be designed so that file boundaries are based on preset limits or so that the user can adjust the segment length to the user's own preferred time. In some embodiments, the video encoder (hardware or software based) will optimize the file boundary by delaying the boundary from the nominal boundary position until a period of time with relatively static video and audio, i.e., when there are minimal changes in motion. Skilled persons will appreciate, however, that in some embodiments, such segmentation may be implemented via software or hardware.

The digital video camera 10 is an all-in-one, shoot and store digital video camcorder and is designed to operate in extreme weather conditions and in a hands-free manner. The digital video camera 10 is wearable and designed for rugged environments (water, heat, cold, extreme vibrations), and the VholdR™ system includes application mounts 126 to attach to any person, equipment, or vehicle. The internal components of the digital video camera 10 may be silicon treated, coated, or otherwise insulated from the elements, keeping the digital video camera 10 operational, no matter the mud, the dirt, the snow, and the rain.

It will be obvious to those having skill in the art that many changes may be made to the details of the above-described embodiments without departing from the underlying principles of the invention. For example, skilled persons will appreciate that subject matter revealed in any sentence or paragraph can be combined with subject matter from some or all of the other sentences or paragraphs, except where such combinations are mutually exclusive. The scope of the present invention should, therefore, be determined by the following claims.

The invention claimed is:

1. A digital video camcorder, comprising:
a camera housing;
a lens;
a first data storage medium;
an image sensor for capturing image data through the lens and directly or indirectly providing the image data to the first data storage medium;
a video encoder that cooperates with the image sensor;
a microprocessor that provides instructions to the video encoder;
a microphone for capturing audio data and directly or indirectly providing the audio data to the first data storage medium and/or to a second data storage medium;
a manually operable switch for controlling operation of the image sensor, the video encoder, and the microphone, wherein the manually operable switch has an ON position and an OFF position such that placement of the switch in the ON position causes power to be supplied to the image sensor, video encoder, and microphone and causes recording of video and audio data onto the first data storage medium and/or the second data storage medium to be initiated; and
a switch activator for the manually operable switch, wherein the switch activator is moveable over a slidably engageable surface of the camera housing to slidably engage the camera housing wherein the camcorder further comprises:
a front in proximity to the lens,
a back in opposition to the front,
a top extending between the front and the back,
a bottom extending between the front and the back, wherein the bottom is in opposition to the top,
a side extending between the top and the bottom,
a top length between the front and the back, and
a side height between the top and the bottom, wherein the top length is greater than the side height, and wherein
the camera housing has a top surface area at the top, and
the slidably engageable surface forms a major portion of the top surface area.

2. The digital video camcorder of claim 1, wherein the switch activator covers a major portion of the top surface area.

3. The digital video camcorder of claim 1, wherein the top has a nonplanar contour, and the switch activator is positioned at the top and has a nonplanar contour that is configured to slide along the nonplanar contour of the top.

4. The digital video camcorder of claim 1, wherein the switch activator is slidable in a direction of travel between a first direction and a substantially opposite direction.

5. The digital video camcorder of claim 1, further comprising:
a battery;
video and audio recording electronics, including the data storage medium, the image sensor, the video encoder, and the microphone; and
a pulse power system that draws power from the battery without pre-activation, the pulse power system including an impulse sensor to monitor for activation of the switch activator, wherein placing the switch activator in the OFF position triggers the pulse power system to cause the recording electronics to be without power, wherein placing the switch activator in the ON position triggers the pulse power system to cause the recording electronics to be supplied with power such that the switch activator causes video and audio data to be recorded onto the data storage medium and/or the second data storage medium.

6. A digital video camcorder, comprising:
a camera housing;
a lens;
a first data storage medium;
an image sensor for capturing image data through the lens and directly or indirectly providing the image data to the first data storage medium;
a video encoder that cooperates with the image sensor;
a microprocessor that provides instructions to the video encoder;
a microphone for capturing audio data and directly or indirectly providing the audio data to the first data storage medium and/or to a second data storage medium;
a manually operable switch for controlling operation of the image sensor, the video encoder, and the microphone, wherein the manually operable switch has an ON position and an OFF position such that placement of the switch in the ON position causes power to be supplied to the image sensor, video encoder, and microphone and causes recording of video and audio data onto the first data storage medium and/or the second data storage medium to be initiated; and
a switch activator for the manually operable switch, wherein the switch activator is moveable over a slidably engageable surface of the camera housing to slidably engage the camera housing, wherein the camcorder further comprises:
a front in proximity to the lens,
a back in opposition to the front,
a top extending between the front and the back,
a bottom extending between the front and the back, wherein the bottom is in opposition to the top,
a side extending between the top and the bottom,
a top length between the front and the back, and
a side height between the top and the bottom, wherein the top length is greater than the side height, and wherein
the camera housing has a top surface area at the top, and
the switch activator covers a major portion of the top surface area.

7. The digital video camcorder of claim 6, wherein the top has a nonplanar contour, and the switch activator is positioned at the top and has a nonplanar contour that is configured to slide along the nonplanar contour of the top.

8. The digital video camcorder of claim 6, wherein the switch activator is slidable in a direction of travel between a first direction and a substantially opposite direction.

9. The digital video camcorder of claim 6, further comprising:
a battery;
video and audio recording electronics, including the first data storage medium, the image sensor, the video encoder, and the microphone; and
a pulse power system that draws power from the battery without pre-activation, the pulse power system including an impulse sensor to monitor for activation of the switch activator, wherein placing the switch activator in the OFF position triggers the pulse power system to cause the recording electronics to be without power, wherein placing the switch activator in the ON position triggers the pulse power system to cause the recording electronics to be supplied with power such that the switch activator causes video and audio data to be recorded onto the first data storage medium and/or the second data storage medium.

10. A digital video camcorder, comprising:
a camera housing;
a lens;
a first data storage medium;
an image sensor for capturing image data through the lens and directly or indirectly providing the image data to the first data storage medium;
a video encoder that cooperates with the image sensor;
a microprocessor that provides instructions to the video encoder;
a microphone for capturing audio data and directly or indirectly providing the audio data to the first data storage medium and/or to a second data storage medium;
a manually operable switch for controlling operation of the image sensor, the video encoder, and the microphone, wherein the manually operable switch has an ON position and an OFF position such that placement of the switch in the ON position causes power to be supplied to the image sensor, video encoder, and microphone and causes recording of video and audio data onto the first data storage medium and/or the second data storage medium to be initiated;
a switch activator for the manually operable switch, wherein the switch activator is moveable over a slidably engageable surface of the camera housing to slidably engage the camera housing; and
a housing plane that transects the camera housing, wherein the camcorder further comprises:
a front in proximity to the lens,
a back in opposition to the front,
a top extending between the front and the back,
a bottom extending between the front and the back, wherein the bottom is in opposition to the top,
a side extending between the top and the bottom,
a top length between the front and the back, and
a side height between the top and the bottom, wherein the top length is greater than the side height, and wherein
the camera housing has a housing length along the housing plane at the top, and
the switch activator has an activator length that forms a major portion of the housing length at the top.

11. The digital video camcorder of claim 10, wherein the top has a nonplanar contour, and the switch activator is positioned at the top and has a nonplanar contour that is configured to slide along the nonplanar contour of the top.

12. The digital video camcorder of claim 10, wherein the switch activator is slidable in a direction of travel between a first direction and a substantially opposite direction.

13. The digital video camcorder of claim 10, further comprising:
a battery;
video and audio recording electronics, including the first data storage medium, the image sensor, the video encoder, and the microphone; and
a pulse power system that draws power from the battery without pre-activation, the pulse power system including an impulse sensor to monitor for activation of the switch activator, wherein placing the switch activator in the OFF position triggers the pulse power system to cause the recording electronics to be without power, wherein placing the switch activator in the ON position triggers the pulse power system to cause the recording electronics to be supplied with power such that the switch activator causes video and audio data to be recorded onto the first data storage medium and/or the second data storage medium.

14. A digital video camcorder, comprising:
a camera housing;
a lens;
a first data storage medium;
an image sensor for capturing image data through the lens and directly or indirectly providing the image data to the first data storage medium;
a video encoder that cooperates with the image sensor;
a microprocessor that provides instructions to the video encoder;
a microphone for capturing audio data and directly or indirectly providing the audio data to the first data storage medium and/or to a second data storage medium;
a manually operable switch for controlling operation of the image sensor, the video encoder, and the microphone, wherein the manually operable switch has an ON position and an OFF position such that placement of the switch in the ON position causes power to be supplied to the image sensor, video encoder, and microphone and causes recording of video and audio data onto the first data storage medium and/or the second data storage medium to be initiated; and
a switch activator for the manually operable switch, wherein the switch activator is moveable over a slidably engageable surface of the camera housing to slidably engage the camera housing, wherein the camcorder further comprises:
a front in proximity to the lens,
a back in opposition to the front,
a top extending between the front and the back,
a bottom extending between the front and the back, wherein the bottom is in opposition to the top,
a side extending between the top and the bottom,
a top length between the front and the back, and
a side height between the top and the bottom, wherein the top length is greater than the side height, and wherein
the top has a top surface with a nonplanar contour, and
the switch activator is positioned at the top surface and has a nonplanar contour that is configured to slide along the nonplanar contour of the top surface.

15. The digital video camcorder of claim 14, wherein the switch activator is slidable in a direction of travel between a first direction and a substantially opposite direction.

16. The digital video camcorder of claim 14, further comprising:
a battery;
video and audio recording electronics, including the first data storage medium, the image sensor, the video encoder, and the microphone; and
a pulse power system that draws power from the battery without pre-activation, the pulse power system including an impulse sensor to monitor for activation of the switch activator, wherein placing the switch activator in the OFF position triggers the pulse power system to cause the recording electronics to be without power, wherein placing the switch activator in the ON position triggers the pulse power system to cause the recording electronics to be supplied with power such that the switch activator causes video and audio data to be recorded onto the first data storage medium and/or the second data storage medium.

17. A digital video camcorder, comprising:
a camera housing;
a lens;
a first data storage medium;
an image sensor for capturing image data through the lens and directly or indirectly providing the image data to the first data storage medium;
a video encoder that cooperates with the image sensor;
a microprocessor that provides instructions to the video encoder;
a microphone for capturing audio data and directly or indirectly providing the audio data to the first data storage medium and/or to a second data storage medium;
a manually operable switch for controlling operation of the image sensor, the video encoder, and the microphone, wherein the manually operable switch has an ON position and an OFF position such that placement of the switch in the ON position causes power to be supplied to the image sensor, video encoder, and microphone and causes recording of video and audio data onto the first data storage medium and/or the second data storage medium to be initiated; and
a switch activator for the manually operable switch, wherein the switch activator is moveable over a slidably engageable surface of the camera housing to slidably engage the camera housing, wherein the camcorder further comprises:
a front in proximity to the lens,
a back in opposition to the front,
a top extending between the front and the back,
a bottom extending between the front and the back, wherein the bottom is in opposition to the top,
two sides extending between the top and the bottom,
a top length between the front and the back,
a side height between the top and the bottom, wherein the top length is greater than the side height, and
a top housing width between the two sides, and wherein
the camera housing has a top housing surface,
the slidably engageable surface is recessed beneath the top housing surface and has a slidably engageable surface length,
the switch activator has an activator length that is shorter than the slidably engageable surface length, and
the switch activator has an activator width that forms a major portion of the top housing width.

18. The digital video camcorder of claim 17, wherein the top housing surface has a nonplanar contour, and the switch activator is positioned at the top housing surface and has a nonplanar contour that is configured to slide along the nonplanar contour of the top housing surface.

19. The digital video camcorder of claim 17, wherein the switch activator is slidable in a direction of travel between a first direction and a substantially opposite direction.

20. The digital video camcorder of claim 17, further comprising:
  a battery;
  video and audio recording electronics, including the first data storage medium, the image sensor, the video encoder, and the microphone; and
  a pulse power system that draws power from the battery without pre-activation, the pulse power system including an impulse sensor to monitor for activation of the switch activator, wherein placing the switch activator in the OFF position triggers the pulse power system to cause the recording electronics to be without power, wherein placing the switch activator in the ON position triggers the pulse power system to cause the recording electronics to be supplied with power such that the switch activator causes video and audio data to be recorded onto the first data storage medium and/or the second data storage medium.

21. A digital video camcorder, comprising:
  a camera housing;
  a lens;
  a first data storage medium;
  an image sensor for capturing image data through the lens and directly or indirectly providing the image data to the first data storage medium;
  a video encoder that cooperates with the image sensor;
  a microprocessor that provides instructions to the video encoder;
  a microphone for capturing audio data and directly or indirectly providing the audio data to the first data storage medium and/or to a second data storage medium;
  a manually operable switch for controlling operation of the image sensor, the video encoder, and the microphone, wherein the manually operable switch has an ON position and an OFF position such that placement of the switch in the ON position causes power to be supplied to the image sensor, video encoder, and microphone and causes recording of video and audio data onto the first data storage medium and/or the second data storage medium to be initiated; and
  a switch activator for the manually operable switch, wherein the switch activator is moveable over a slidably engageable surface of the camera housing to slidably engage the camera housing, wherein the camcorder further comprises:
    a front in proximity to the lens,
    a back in opposition to the front, wherein the switch activator is slidable in a direction of travel between the front and the back,
    a top extending between the front and the back,
    a top surface at the top,
    a bottom extending between the front and the back, wherein the bottom is in opposition to the top,
    a side between the top and the bottom,
    a top length between the front and the back, and
    a side height between the top and the bottom, wherein the top length is greater than the side height.

22. The digital video camcorder of claim 21, wherein the manually operable switch controls supply of power to the microprocessor, the image sensor, and the video encoder, such that when the manually operable switch is in the OFF position, the microprocessor, the image sensor, and the video encoder all cease to receive power substantially concurrently and thereby substantially instantaneously cease recording video.

23. The digital video camcorder of claim 21, wherein the manually operable switch controls supply of power to additional electronics such that the additional electronics are deactivated when the manually operable switch is in the OFF position and such that the additional electronics are activated when the manually operable switch is in the ON position.

24. The digital video camcorder of claim 21, wherein the switch is a magnetically controlled switch.

25. The digital video camcorder of claim 21, wherein the switch activator has an activator area that covers a major portion of the slidably engageable surface.

26. The digital video camcorder of claim 21, wherein the lens, image sensor, and data storage medium are enclosed within a camera housing and the switch controls activation of the image data recording operation without penetrating the camera housing.

27. The digital video camcorder of claim 21, wherein:
  the camera housing has a contoured housing surface;
  the switch activator slidably engageable surface is recessed beneath the contoured housing surface;
  the switch activator has a contoured switch surface that matches the contoured housing surface; and
  the switch activator is mounted such that the contoured switch surface is flush with the contoured housing surface.

28. The digital video camcorder of claim 21, further comprising:
  an audio encoder that cooperates with the microphone, the microprocessor providing instructions to the audio encoder, and the manually operable switch being adapted for substantially simultaneously controlling a supply of power to the microphone and the audio encoder such that placement of the switch in the ON position causes the microphone and the audio encoder to both receive power substantially concurrently and thereby substantially instantaneously causes recording of audio data onto the first data storage medium and/or the second data storage medium to be initiated.

29. The digital video camcorder of claim 28, wherein the manually operable switch controls the supply of power to the microprocessor, the microphone, and the audio encoder, such that when the switch is placed in the OFF position the microprocessor, the microphone, and the audio encoder all cease to receive power substantially concurrently and thereby substantially instantaneously cease recording the audio data.

30. The digital video camcorder of claim 21, further comprising:
  an audio encoder that cooperates with the microphone, wherein placement of the switch in the ON position causes the microprocessor, the image sensor, the video encoder, the microphone, and the audio encoder all to receive power substantially concurrently and thereby substantially instantaneously initiate recording of the video data and audio data onto the first data storage medium and/or the second data storage medium.

31. The digital video camcorder of claim 21, further comprising:
  an audio encoder that cooperates with the microphone, wherein placement of the switch in the OFF position causes the microprocessor, the image sensor, the video encoder, the microphone, and the audio encoder all to cease to receive power substantially concurrently and thereby substantially instantaneously cease recording of the video data and audio data onto the first data storage medium and/or the second data storage medium.

32. The digital video camcorder of claim 21, wherein the manually operable switch activator covers the microphone whenever the manually operable switch is in the OFF position, and wherein the switch activator exposes the microphone whenever the manually operable switch is in the ON position.

33. The digital video camcorder of claim 21, wherein the digital video camcorder is an integrated point of view digital video camcorder that is operable for mounting to a person, a vehicle, or equipment and operable for capturing video during motion of the person, the vehicle, or the equipment, and in which the image data represents a scene during motion of the person, the vehicle, or the equipment.

34. The digital video camcorder of claim 21, further comprising:
a battery;
video and audio recording electronics, including the first data storage medium, the image sensor, the video encoder, and the microphone; and
a pulse power system that draws power from the battery without pre-activation, the pulse power system including an impulse sensor to monitor for activation of the switch activator, wherein placing the switch activator in the OFF position triggers the pulse power system to cause the recording electronics to be without power, wherein placing the switch activator in the ON position triggers the pulse power system to cause the recording electronics to be supplied with power such that the switch activator causes video and audio data to be recorded onto the first data storage medium and/or the second data storage medium.

35. A digital video camcorder, comprising:
a camera housing;
a lens;
a first data storage medium;
an image sensor for capturing image data through the lens and directly or indirectly providing the image data to the first data storage medium;
a video encoder that cooperates with the image sensor;
a microprocessor that provides instructions to the video encoder;
a microphone for capturing audio data and directly or indirectly providing the audio data to the first data storage medium and/or to a second data storage medium;
a manually operable switch for controlling operation of the image sensor, the video encoder, and the microphone, wherein the manually operable switch has an ON position and an OFF position such that placement of the switch in the ON position causes power to be supplied to the image sensor, video encoder, and microphone and causes recording of video and audio data onto the first data storage medium and/or the second data storage medium to be initiated;
a switch activator for the manually operable switch, wherein the switch activator is moveable over a slidably engageable surface of the camera housing to slidably engage the camera housing;
a battery;
video and audio recording electronics, including the first data storage medium, the image sensor, the video encoder, and the microphone; and
a pulse power system that draws power from the battery without pre-activation, the pulse power system including an impulse sensor to monitor for activation of the switch activator, wherein placing the switch activator in the OFF position triggers the pulse power system to cause the recording electronics to be without power, wherein placing the switch activator in the ON position triggers the pulse power system to cause the recording electronics to be supplied with power such that the switch activator causes video and audio data to be recorded onto the first data storage medium and/or the second data storage medium.

36. The digital video camcorder of claim 35, wherein the pulse power system is operable to power up the image sensor, video encoder, and microphone and initiate recording directly without any pre-activation whenever the switch is placed in the ON position, and in which the pulse power system cuts power to the image sensor, video encoder, and microphone whenever the switch is placed in the OFF position to immediately stop audio and video capturing operations.

37. A digital video camcorder, comprising:
a camera housing;
a lens;
a front that is in proximity to the lens;
a back that is in opposition to the front;
a top extending between the front and the back of the camcorder;
a bottom extending between the front and the back of the camcorder, wherein the bottom is in opposition to the top;
two sides extending between the top and the bottom;
a data storage medium;
an image sensor;
a video encoder;
a microprocessor;
a microphone;
a manually operable switch for controlling operation of the image sensor, the video encoder, and the microphone to initiate video and audio recording; and
a switch activator for the manually operable switch, wherein the switch activator is moveable over a slidably engageable surface of the camera housing at the top of the camcorder, wherein the camera housing has a housing length at the top of the camcorder, wherein the slidably engageable surface has a slidably engageable surface length that forms a major portion of the housing length, and wherein the switch activator is slidable in a direction of travel between the back and the front.

* * * * *